(12) United States Patent
Shakes et al.

(10) Patent No.: US 7,246,706 B1
(45) Date of Patent: Jul. 24, 2007

(54) SORTING USING MODULAR STATIONS

(75) Inventors: Jonathan J. Shakes, Mercer Island, WA (US); Nicholas M. Hanssens, Seattle, WA (US); Jan Bohlmann, Reno, NV (US); Philipp K. Janert, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 56 days.

(21) Appl. No.: 11/023,759

(22) Filed: Dec. 28, 2004

(51) Int. Cl.
*B07C 5/00* (2006.01)

(52) U.S. Cl. ...................... 209/630; 209/614
(58) Field of Classification Search ............... 209/559, 209/583, 614, 630, 933; 414/268
See application file for complete search history.

(56) References Cited

U.S. PATENT DOCUMENTS

| | | | |
|---|---|---|---|
| 5,246,332 A * | 9/1993 | Bernard et al. ............. | 414/807 |
| 5,934,413 A * | 8/1999 | Konig et al. ................. | 186/56 |
| 6,061,607 A * | 5/2000 | Bradley et al. ............. | 700/216 |
| 6,377,867 B1 | 4/2002 | Bradley et al. | |
| 6,654,662 B1 * | 11/2003 | Hognaland .................. | 700/214 |
| 6,971,833 B1 | 12/2005 | Freudelsperger et al. | |
| 2003/0116484 A1 * | 6/2003 | Takizawa .................... | 209/630 |

OTHER PUBLICATIONS

"Product Search," printed from http://mailroomconsultancysurveys.com/mail . . . on Jul. 29, 2005, Apr. 15, 2004, (17 Pages).
U.S. Appl. No. 11/023,737, filed Dec. 28, 2004.

* cited by examiner

*Primary Examiner*—Joseph Rodriguez
(74) *Attorney, Agent, or Firm*—Robert C. Kowert; Meyertons, Hood, Kivlin, Kowert & Goetzel, P.c.

(57) ABSTRACT

System and method for modular sorting stations. A sorting station may be subdivided into two or more modular bins. A modular bin may be partitioned into compartments. Each compartment may be configured to receive one order including one or more items. Modular bins may be partitioned into compartments of different sizes to receive orders of different sizes. A modular bin may be removed from a sorting station and conveyed to a packing station for packing or other sorting station to continue sorting. Picked items may be received and sorted for rebinning into the modular bins manually or using an automated sorting mechanism. A control system may direct the sorting and rebinning operation. Modular sorting stations may be located adjacent to packing stations or, alternatively, away from packing stations and, when a modular bin is complete, it may be conveyed to an appropriate packing station for packing.

39 Claims, 17 Drawing Sheets

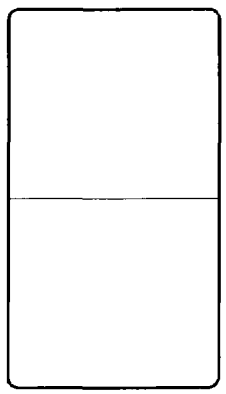
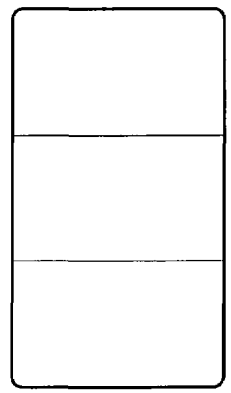
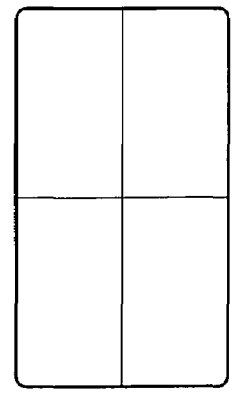
Figure 7A     Figure 7B     Figure 7C
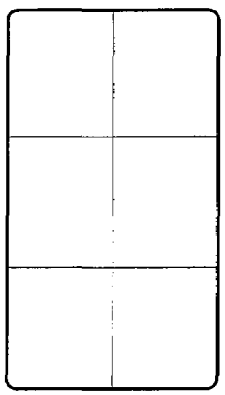
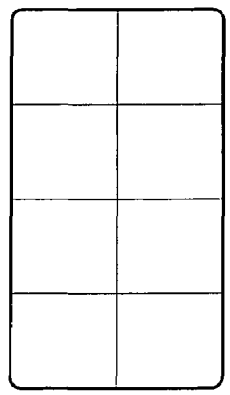
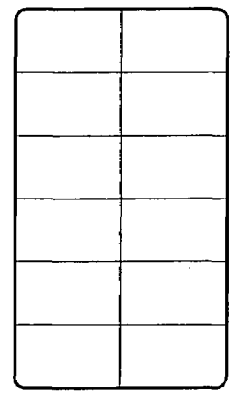
Figure 7D     Figure 7E     Figure 7F
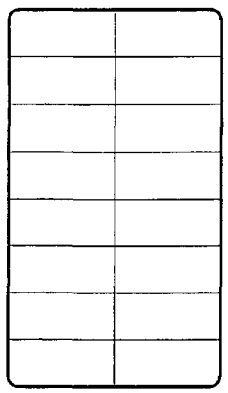
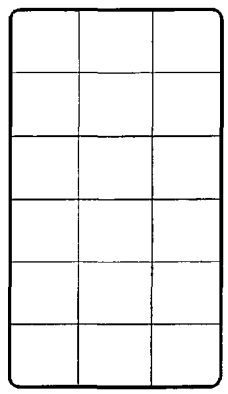
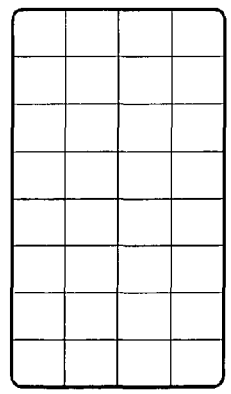
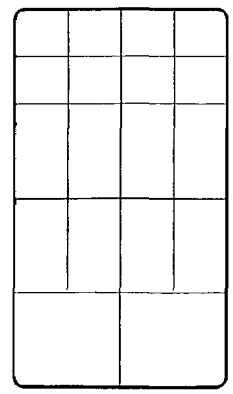
Figure 7G     Figure 7H     Figure 7I     Figure 7J

SORTING USING MODULAR STATIONS

BACKGROUND OF THE INVENTION

1. Field of the Invention

This invention relates to materials handling systems such as order processing systems and, more particularly, to stations for receiving and sorting picked items for orders.

2. Description of the Related Art

Retailers, wholesalers, and other distributors of product (which may collectively be referred to as distributors) typically maintain an inventory of various items that may be ordered by clients or customers. This inventory may be maintained and processed at a materials handling facility which may include one or more of, but not limited to: warehouses, distribution centers, cross-docking facilities, order fulfillment facilities, packaging facilities, shipping facilities, or other facilities or combinations of facilities for performing one or more functions of material (inventory) handling. FIG. 1 illustrates a broad view of the operation of a conventional materials handling facility. Multiple customers 10 may submit orders 20 to the distributor, where each order 20 specifies one or more items from inventory 30 to be shipped to the customer that submitted the order. To fulfill the customer orders 20, the one or more items specified in each order may be retrieved or "picked" from inventory 30 (which may also be referred to as stock storage) in the materials handling facility, as indicated at 40. Picked items may be delivered to one or more stations in the materials handling facility for sorting 50 into their respective orders, packing 60, and finally shipping 70 to the customers 10. Note that a picked, packed and shipped order does not necessarily include all of the items ordered by the customer; a shipped order may include only a subset of the ordered items available to ship at one time from one inventory-storing location. Also note that a materials handling facility typically also includes a receiving operation for receiving shipments of stock from various vendors and placing the received stock into stock storage. Further, note that the various operations of a materials handling facility may be located in one building or facility, or alternatively may be spread or subdivided across two or more buildings or facilities.

FIG. 2 illustrates an exemplary physical layout of a conventional material handling facility, specifically an order fulfillment facility, or center. At any time, one or more agents of the distributor may each be picking items from inventory 30 to fulfill portions or all of one or more orders. This may result in a stream and/or batches of picked items for multiple incomplete or complete orders being delivered to a sorting station 50 for sorting into their respective orders for packing 60 and shipping 70. A stream may be a continuous or nearly continuous flow of picked items arriving at a sorting station 50, while groups of picked items arriving periodically or aperiodically at a sorting station 50 may be referred to as batches. Note that portions of an order may be received at different times, so sorting 50 and packing 60 may have to wait for one or more items for some orders to be delivered to the sorting station(s) 50 before completion of processing of the orders. The stream or batches of incoming picked items are sorted into their respective orders at the sorting station(s) 50. Conventionally, the picked items may be sorted into a fixed array of "pigeon holes" or slots, with each slot receiving one order. Once an order is completed at a sorting station 50, the order is ready to proceed to a packing station 60 to be packaged for shipping 70. Note that an order fulfillment center may also include one or more receiving stations for receiving shipments of stock from various vendors. The received stock may then be placed into stock storage. Further, note that the various operations and stations of an order fulfillment center may be located in one building or facility, or alternatively may be spread or subdivided across two or more buildings or facilities.

A materials handling facility such as an order fulfillment center 80 may implement an order fulfillment control system, or control system for short. A control system (not shown) may include hardware and software configured for assisting and/or directing agents in the order fulfillment center 80 in fulfilling customers' orders. Items in inventory 30 may be marked or tagged with a bar code, radio frequency identification (RFID) tag, Universal Product Code (UPC), Stock-Keeping Unit (SKU) code, serial number, and/or other designation (including proprietary designations) to facilitate order fulfillment center 80 operations, including, but not limited to, picking, sorting 50 and packing 60. These designations, or codes, may identify items by type, and/or may identify individual items within a type of item. The control system may include hand-held, mobile and/or fixed scanners or scanning devices that may be able to scan the marks or tags on individual items to determine and record the item and/or item type of the items.

The control system may be able to receive order information for each order specifying the item or items to be picked to fulfill the order. Each order may be assigned a unique order number for use in the order fulfillment process. Item and/or item type information, including associated item and/or item type designations or codes and possibly other descriptive information, may be entered into the control system for each item picked to fulfill each order. This information may be scanned into the control system from marks or tags on the items or, alternatively, manually entered. A combination of scanning and manual entry may be employed during picking.

Conventionally, sorting 50 may be performed using automated sorting mechanisms or manual sorting systems. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders. Such automated sorting mechanisms are typically expensive in both cost and floor area. Further, automated sorting mechanisms tend to be more expensive than manual sorting systems in situations where inventory throughput demands may vary significantly, for example from month to month, and/or where inventory throughput demands may increase rapidly over time, due to the need to pay for fixed automation equipment that may only be fully utilized at peak demand periods.

SUMMARY

Various embodiments of a system and method for implementing and utilizing modular sorting stations in a manual sorting operation of materials handling facilities such as order fulfillment facilities or centers are described. In embodiments, a sorting station may be subdivided into two or more removable modules, or modular bins. A modular bin may be, but is not necessarily, partitioned into two or more compartments. In one embodiment, each compartment in a modular bin may be of the same or similar size and configuration as the other compartments in the modular bin. Each compartment of a modular bin may be configured to receive one order including one or more items picked from stock storage. In one embodiment, different modular bins may be partitioned into compartments of different sizes and/or configurations to receive orders of different sizes for packing. For example, in an order fulfillment center that fulfills customer orders for CDs and DVDs, a first group of modular bins may be configured to receive single item orders, a second group may be configured to receive orders of two to six items, and a third group may be configured to receive orders of more than six items.

Rather than moving an entire sorting station, each modular bin of a modular sorting station may be removed from the sorting station and moved or conveyed to another modular sorting station, to a packing station for packing, or to other stations or locations in a materials handling facility as necessary or desired. A modular bin may be removed from a modular sorting station and moved or conveyed to another location when empty, partially complete, or complete. A modular bin is complete when all the items for the orders assigned to compartments in the modular bin have been received in the modular bin.

Items picked to fulfill orders may be received in batches or in a stream at a modular sorting station. These incoming items may be sorted for rebinning into the appropriate compartments of the modular bins of the sorting station designated for receiving their respective orders manually, or alternatively using an automated sorting mechanism. In manual sorting, an agent or agents performing the sorting and rebinning sorts the items into their respective orders at the modular sorting station by placing the picked items into the compartments of the modular bins assigned to their orders. In one embodiment using an automated sorting mechanism, the picked items may be partially sorted into groups of two or more partially complete and/or complete orders by the automated sorting mechanism, and agents may then sort or "rebin" the items in the groups into the compartments in the modular bins assigned to their respective orders. In either type of sorting, an order fulfillment control system may assist or direct the sorting and rebinning operation. In one embodiment, components of the materials handling facility including one or more of, but not limited to, items, orders, modular sorting stations, modular bins, and compartments of modular bins may be assigned identifiers or codes that may be used by the control system in directing the sorting and rebinning operation, and possibly other operations of the materials handling facility.

In one embodiment, modular sorting stations may be located away from packing stations in the materials handling facility. In this embodiment, when a modular bin of a modular sorting station is complete (e.g., when all items for all orders associated with the modular bin have been picked and placed or "rebinned" in the appropriate compartments of the modular bin), the modular bin may be removed from the modular sorting station and conveyed using some conveyance mechanism to one of the packing stations. In one embodiment, each packing station may be configured to package orders of a particular size and/or packing type, and each modular bin may be conveyed to an appropriate packing station configured to package orders of a size or type that the modular bin is configured to receive. As used herein, the size of an order generally refers to the physical dimensions of the assembled items of the order and not to the number of individual items in the order. Note that, in some instances, the physical dimensions of an order may be correlated to the number of items in the order. In another embodiment, each modular sorting station may be located adjacent to a packing station, and an agent assigned to the packing station may remove a complete modular bin and move the modular bin to the packing station work area for packing.

In one embodiment, partially complete modular bins may be moved from one sorting station to another to continue the sorting and rebinning of items into the modular bin at the other modular sorting station.

BRIEF DESCRIPTION OF THE DRAWINGS

FIGS. 7A through 7J illustrate exemplary modular bins subdivided into different numbers and configurations of compartments according to embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Rebinning and Sorting Stations

One type of manual sorting system that may be implemented in materials handling facilities such as order fulfillment facilities or centers may be referred to as rebinning. Materials handling facilities may include one or more of, but are not limited to: warehouses, distribution centers, cross-docking facilities, order fulfillment facilities, packaging facilities, shipping facilities, or other facilities or combination of facilities for performing one or more functions of material (inventory) handling.

In one embodiment of a rebinning operation, batches or a stream of incoming picked items for multiple different customer orders are received at a sorting station, and sorted by "rebinning" the picked items into their respective orders in bins at the sorting station. Note that "rebin" and "rebinning" are used to refer to the process of sorting and placing picked items for orders into bins at a sorting station to differentiate this operation from "binning", which generally refers to placing received items in "bins" in stock storage. Rebinning is an efficient way to sort picked items received in batches or in a stream at a sorting station into their respective orders. The capital equipment necessary to implement rebinning is less expensive than automated sorting mechanisms. The time it takes to sort items using rebinning is not typically significantly longer than it takes a human to induct the items into an automated sorting mechanism.

Figure 1:
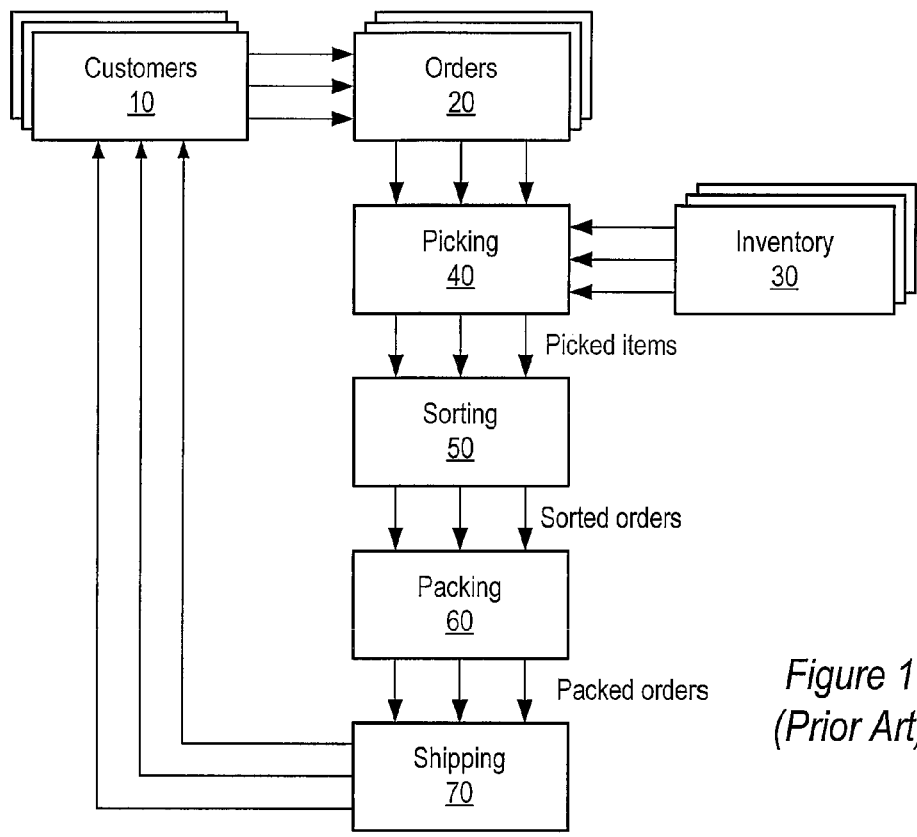
FIG. 1 illustrates a broad view of the operation of a conventional materials handling facility.
Figure 2:
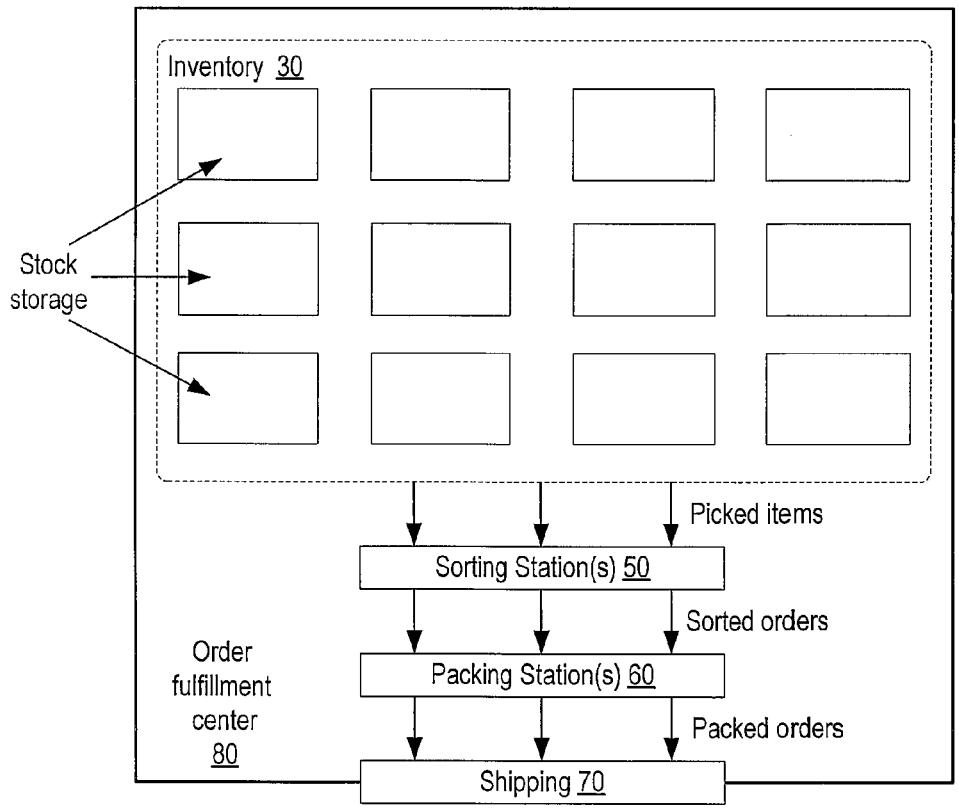
FIG. 2 illustrates an exemplary physical layout of a conventional order fulfillment facility.
Figure 3:
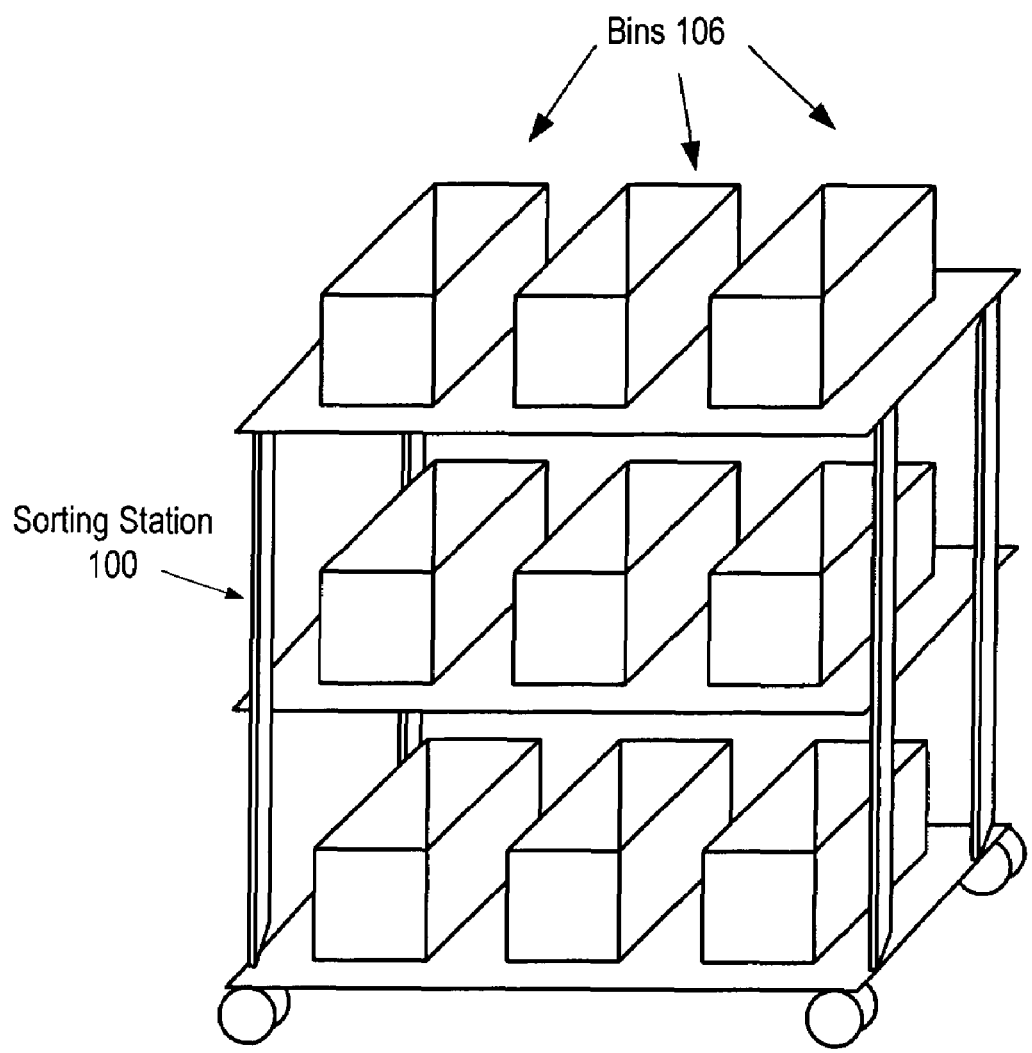
FIG. 3 illustrates an exemplary sorting station.

An exemplary sorting station is illustrated in FIG. 3. A sorting station 100 may, for example, be a rack or cart including a grid or array of two or more bins 106 configured to receive orders picked from stock storage. A sorting station 100 may be, but is not necessarily, mounted on wheels, casters or rollers, and thus may be, but is not necessarily, mobile. Note that bins 106 are not necessarily arranged on a rack or cart. Broadly, a sorting station may be defined as a collection of two or more bins organized in some fashion to receive and sort picked items for orders into the bins 106. As a minimal configuration, a sorting station may be two (or more) bins 106 arranged together on the floor, on a pallet, on a table, etc.

A control system may associate each order with or assign each order to one or more of the bins 106 in a sorting station 100. As the picked items are received at the sorting station 100, a tag or mark on each item may be manually scanned or otherwise entered into the control system, and the control system may then direct the operator to rebin the item in a particular one of the bins 106 in the sorting station 100. Each bin 106, or alternatively two or more bins for larger orders, receives the items to fulfill one particular customer order. Once an order is filled and removed from the bin(s) 106 for packing, the bin(s) 106 may then be assigned to and used for receiving another picked order at the sorting station.

As previously mentioned, each bin 106 in the sorting station 100 may receive the one or more items for one customer order. Once the items picked for a customer order are in the bin 106, a packer may remove the items from the bin 106 and package the items in the order for shipping. Note that a picked, packed and shipped order does not necessarily include all of the items ordered by the customer; a shipped order may include only a subset of the ordered items available to ship at one time from one inventory-storing location. In one embodiment, the bins 106 may be fixed to the sorting station 100, and thus each item must be removed from the bin 106 attached to the sorting station 100. Alternatively, in other embodiments, the bins 106 may be removable, and thus the packer may, but does not necessarily, remove the entire bin 106 from the sorting station 100 and move it to the packing station for packing.

Performing rebinning and packing operations on the same side of the sorting station 100 may lead to conflicts between the items and orders coming in to be rebinned, the agents doing the rebinning, the agents doing the packing, and the packing equipment and operation.

Figure 4:
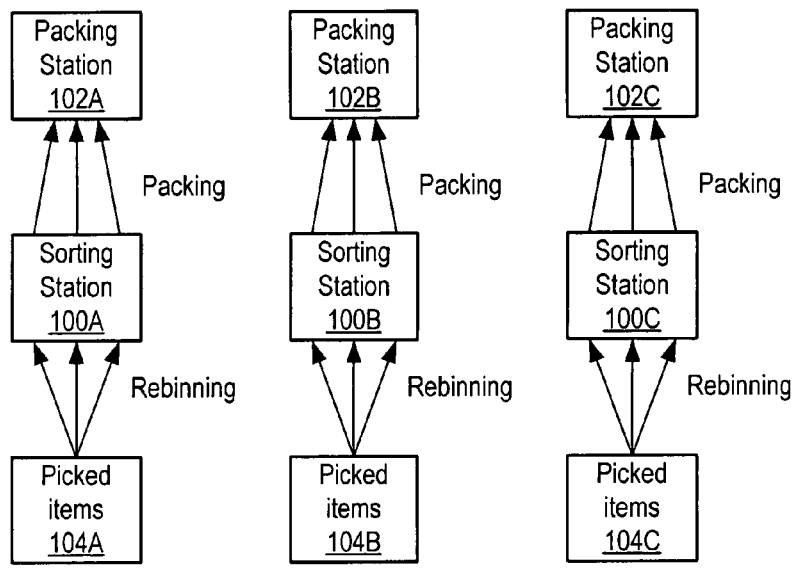
FIG. 4 illustrates an exemplary rebinning and packing configuration where sorting stations are fixed at each packing station, and picked items are sorted into bins at the sorting stations, with one order per bin, and removed from the sorting station one order at a time for packing at the packing station.

One alternative to rebinning and packing accessing the same side of the sorting station 100 is to put the item receiving and rebinning operations on one side of the sorting station 100 and the packing operations and equipment on the other side, and configure the sorting station 100 with a passthrough so that the rebinners and packers can work on opposite sides of the sorting station. FIG. 4 illustrates an exemplary rebinning and packing configuration in which sorting stations 100 are fixed at each packing station 102, and picked items 104 are sorted into bins at sorting stations 100, with one order per bin, and removed from the sorting station one order at a time for packing at the packing station. When an order is complete in a bin, the order may be removed from the sorting station 100 on the opposite side of the sorting station 100 than the side where rebinning is performed for packing at the packing station 102. However, locating a sorting station next to a packing station may limit the available work area for rebinners and/or packers.

Figures 5A, 5B, 5C:
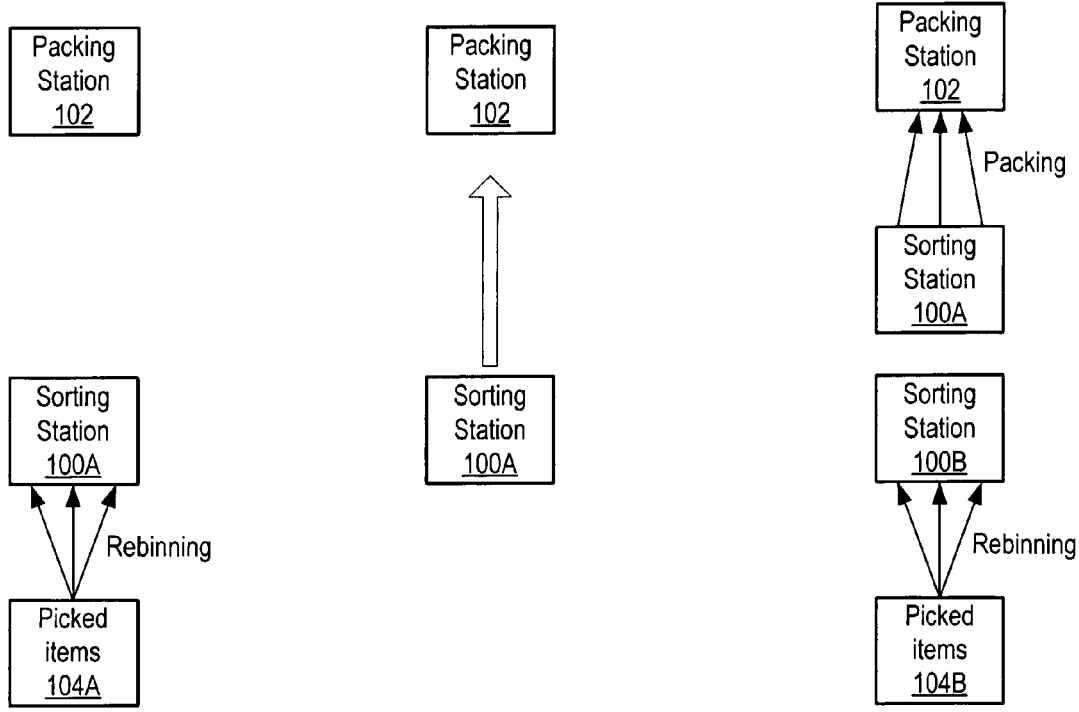
FIGS. 5A through 5C illustrate an exemplary rebinning and packing configuration where sorting stations are mobile, and are moved to a packing station when the orders in the bins are completed.

Another alternative to rebinning and packing accessing the same side of the sorting station 100 is to make the sorting station(s) mobile, for example by mounting them on wheels, so that a sorting station can be moved from an area specified for rebinning to the packing stations, and then replacing a moved sorting station with an empty sorting station to continue the rebinning operation. FIGS. 5A through 5C illustrate an exemplary rebinning and packing configuration where sorting stations 100 are mobile, and are moved to a packing station 102 when the orders in the bins are completed. In FIG. 5A, sorting station 100A is rebinned with items 104A picked from inventory to fill orders associated with the bins on the sorting station 100A at a rebinning location away from the packing station 102. When all the orders associated with the bins on sorting station 100A are filled, the sorting station 100A is moved to packing station 102 for packing, as illustrated in FIGS. 5B and 5C. Moved sorting station 100A may then be replaced with an empty sorting station 100B to continue rebinning of picked items 104B, as illustrated in FIG. 5C.

The rebinning and packing method described in FIGS. 5A-5C tends to be "batchy". If there is an item not yet picked for an order, the entire sorting station 100 may be held up until the last item shows up, even though the rest of the orders on the sorting station 100 are filled. Due to the inherent batchiness, a packing station 102 may experience times when there is no sorting station 100 ready to be packed. Another problem is that sorting stations 100 must be moved from one area to another, resulting in time consumed simply moving sorting stations 100 about. Sorting stations 100 may also be large and heavy, especially when full, and thus not easy to move around. There is also a risk that items or even entire bins may fall off the sorting station 100 when a sorting station 100 is being moved.

A materials handling facility, such as one implementing the exemplary rebinning and packing configurations of FIGS. 4 and 5A-5C, may include multiple packing stations 102. Different packing station 102 may be configured to pack orders of different sizes and/or types of packages. A packing station 102 may include an automated packing mechanism or machine configured to pack orders in boxes or other packaging of a particular size. For example, one packing station 102 may be configured to pack small orders in mailing envelopes, while other packing stations may be configured to pack larger orders in boxes of particular sizes. For the exemplary rebinning and packing configuration of FIG. 4, all the orders going to the sorting station 100 associated with a packing station 102 would need to be for the particular type and/or size of package handled by the associated packing station 102. For the exemplary rebinning and packing configuration of FIGS. 5A-5C, all the orders going to a sorting station 100 would need to be for the particular type and/or size of package handled by the destination packing station 102. However, this tends to push the labor of sorting package types onto the picking operation. The pickers may have to do additional work to deliver picked items to the correct sorting stations 100 for the correct packing stations 102, and may have to make more passes around the stock storage of the materials handling facility as they pick items to fill orders.

Modular Sorting Stations

FIGS. 6A through 20 illustrate means for sorting items picked from stock storage in a materials handling facility into compartments of modular bins of modular sorting stations, where each modular bin may be partitioned into two or more compartments with one or more of the compartments each configured to receive one order including one or more of the items picked from the stock storage. FIGS. 6A through 20 further illustrate means for moving the modular bins from the one or more modular sorting stations to one or more packing stations for packaging of the orders from the compartments of the modular bins.

Figure 6A:
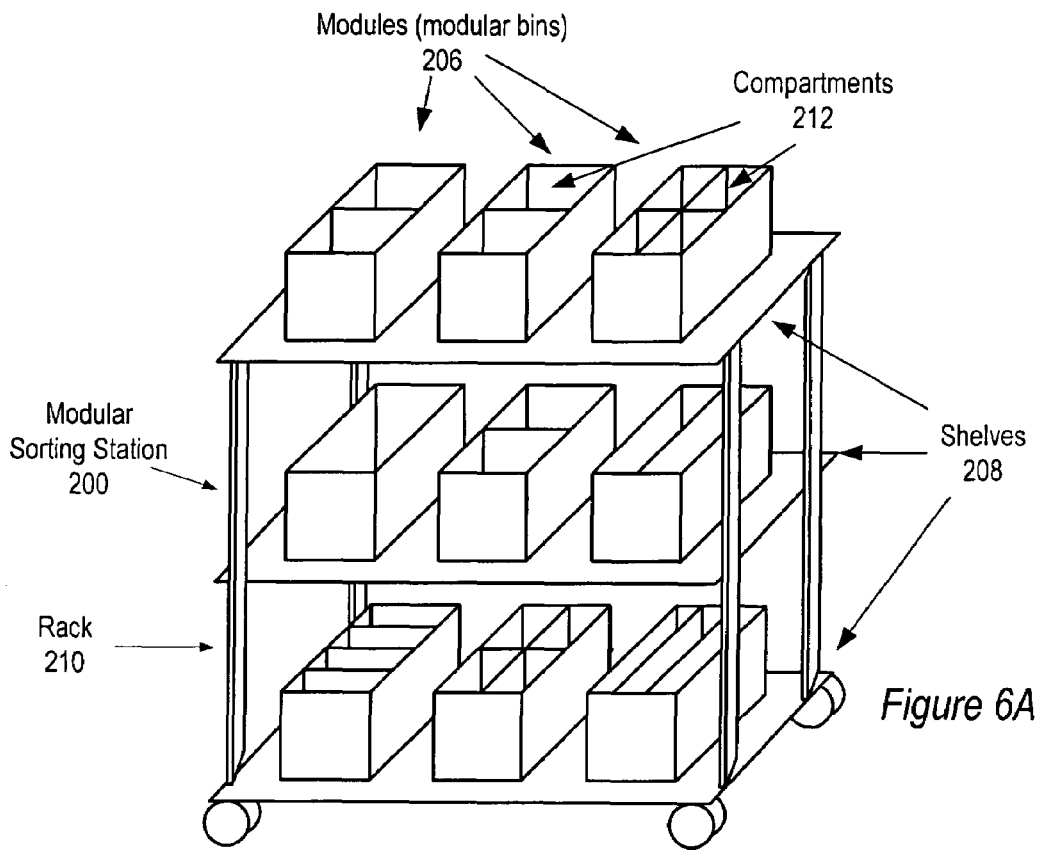
FIGS. 6A through 6C illustrate exemplary configurations for modular sorting stations according to embodiments.
Figure 6B:
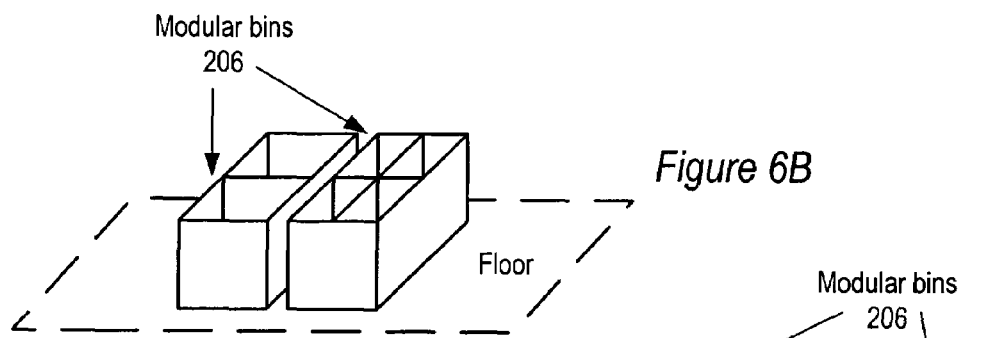
Figure 6C:
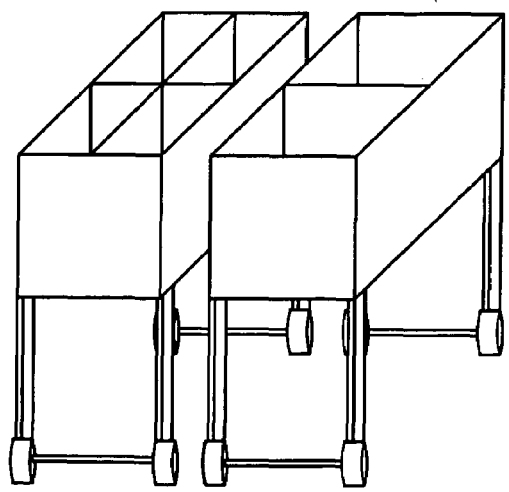

FIGS. 6A through 6C illustrate exemplary configurations for modular sorting stations according to embodiments. In FIG. 6A, modular sorting station 200 may include one or more shelves 208 mounted on a rack 210. The shelves may be adjustable, and in one embodiment may be angled to allow easier access to modular bins 206. Each shelf may be configured to hold one or more removable modules, or modular bins 206. In one embodiment, the modular sorting station 200 may be mounted on rollers, casters or wheels to allow the modular sorting station 200 to be moved, if necessary or desired.

Note that a modular sorting station 200 may not necessarily include shelves 208 mounted on a rack 210, as in the example of FIG. 6A. Broadly, a modular sorting station 200 may be defined as a collection of two or more modular bins 206 organized in some fashion that allows the configuration of the modular bins 206 for presentation to an agent or agents performing sorting and rebinning. A modular sorting station 200 may include two (or more) modular bins 206 arranged together on the floor, on a pallet, on a table, on a conveyor belt or other conveyance mechanism, hanging on hooks on a wall or on a rack, on shelves, on shelves mounted on a rack, etc. FIG. 6B illustrates a minimal configuration for a modular sorting station 200 with two modular bins 206 arranged together on the floor according to one embodiment. In one embodiment, the relative locations of the modular bins 206 to each other in a modular sorting station 200 may be known to the order fulfillment control system, so that the modular bins 206 at a modular sorting station 200 may be presented by the control system to an agent performing sorting and rebinning as a known location at the modular sorting station 200, e.g. "the second modular bin from the left" or "the first modular bin on the top row".

Each modular bin 206 may be, but is not necessarily, subdivided into two or more compartments 212. One or more of the modular bins 206 may not be subdivided, and thus may be said to contain but one "compartment". In one embodiment, each compartment 212 in a subdivided modular bin 206 may be of similar or equal size. In one embodiment, each compartment 212 may be configured to receive the items from one order picked from stock storage. Different ones of the modular bins 206 on a modular sorting station 200 may be subdivided into compartments 212 of different sizes, and thus different modular bins 206 may be configured to receive orders of no larger than the size of the compartments 212 they are subdivided into. Note again that some modular bins 206 may not be subdivided, and thus may be used to receive orders of larger sizes than subdivided modular bins. For even larger orders, two or more modular bins 206 may be required.

In some embodiments, at least some of the modular bins 206 may include wheels, casters, rollers, etc, which may be fixed to the modular bin, retractable or foldable, or, alternatively detachable. FIG. 6C illustrates an exemplary configuration for a modular sorting station 200 including two modular bins 206 mounted on wheels according to one embodiment. Note that, in one embodiment, the wheel assemblies may be foldable, retractable, or removable to allow modular bins 206 to be placed on a modular sorting station rack similar to that illustrated in FIG. 6A. In these embodiments, each modular bin 206 is effectively a small cart, but is also a subset of a modular sorting station 200. These embodiments may, for example, allow the modular bins 206 to be conveyed between stations in the materials handling facility without the necessity of an installed conveyance mechanism such as a conveyor belt. As one example of an application for these modular bin 206 "carts" as illustrated in FIG. 6C, partial sorting and rebinning of picked items into the modular bins 206 may be performed in one building or facility of a materials handling facility. The modular bins 206 may then be rolled onto a truck and transported to another facility or building in the materials handling facility to continue processing, for example to continue sorting and rebinning to complete the orders in the modular bins 206 and/or to pack and ship the orders in the modular bins 206.

FIGS. 7A through 7J illustrate exemplary modular bins subdivided into different numbers and configurations of compartments according to embodiments. FIG. 7A illustrates a modular bin subdivided into two compartments. FIG. 7B illustrates a modular bin subdivided into three compartments. FIG. 7C illustrates a modular bin subdivided into four compartments. FIG. 7D illustrates a modular bin subdivided into six compartments. FIG. 7E illustrates a modular bin subdivided into eight compartments. FIG. 7F illustrates a modular bin subdivided into twelve compartments. FIG. 7G illustrates a modular bin subdivided into sixteen compartments. FIG. 7H illustrates a modular bin subdivided into eighteen compartments. FIG. 7I illustrates a modular bin subdivided into thirty-two compartments.

FIGS. 7A through 7I illustrate exemplary modular bins subdivided into different numbers of compartments of similar or equal size. FIG. 7J illustrates an exemplary modular bin subdivided into compartments of different sizes. In one embodiment, a modular bin may be divided into two or more compartments of different sizes and/or configurations, allowing orders of different sizes to be rebinned into one modular bin.

Note that the modular bin configurations illustrated in FIGS. 7A through 7J are exemplary and not intended to be limiting, and modular bins may be subdivided in similar or different ways into the same or different numbers or configurations of compartments. Also note that, in one embodiment, the dividers used to subdivide modular bins may be adjustable and/or removable to allow the modular bins to be reconfigured into different configurations. In one embodiment, the dividers forming the compartments may be adjustable or flexible, so that when placing items for orders into the compartments, the size or configuration of the compartments may be increased or decreased to accommodate the items in the orders.

Returning to FIG. 6A, items picked to fulfill orders may be received in batches or in a stream at the modular sorting station(s) 200. These incoming items may be manually sorted for rebinning into the appropriate compartments 212 designated for receiving their respective orders in the modular bins 206, or alternatively using an automated sorting mechanism to partially sort the orders into groups of orders which many then be manually sorted for rebinning into the appropriate compartments 212.

In manual sorting, an agent or agents performing the sorting and rebinning sorts the items into their respective orders at the modular sorting station 200. In some embodiments, this sorting may be facilitated by an order fulfillment control system. In one embodiment, an agent may use a scanner, a keyboard, or other fixed or mobile mechanism in communication with a control station of the control system to enter an item code for an incoming picked item into the control system, and the control system may then direct the agent in placing the item into a compartment 212 of one of the modular bins 206 assigned to an order for which the item was picked. Alternatively, the agent may use some other manual or automated mechanism, or a combination of manual and automated mechanisms, to determine which compartment 212 of the modular bins 206 is to receive an incoming picked item. For example, an agent may consult printouts and/or computer displays of orders to manually determine which order a particular item belongs to, and which compartment 212 of which modular bin 206 is designated to receive that order.

Note that compartments 212 in modular bins 206 may be assigned to orders either manually by the agent or automatically by the control system. In one embodiment, if an agent selects an empty compartment 212 to receive an order, then the agent may enter information into the control system specifying which compartment 212 in which modular bin 206, and possibly even in which modular sorting station 200, has been selected to receive the order.

In one embodiment, an automated sorting mechanism may read the item codes from the incoming items inducted into the sorting mechanism and sort the incoming picked items into groups of orders. The groups of orders may then be manually sorted into compartments 212 of the modular bins 206 assigned to the orders. In one embodiment, the control system may direct an agent sorting groups of orders from the sorting mechanism into the modular sorting station 200 as to which compartments 212 in the modular bins 206 of the modular sorting station 200 the items in the group are to be placed in. In other embodiments, other methods and/or mechanisms may be used to move orders from the automated sorting mechanism into their respective compartments 212 in the modular bins 206.

Note that materials placed into the compartments 212 of modular bins 206 are not necessarily limited to only items picked from stock storage. Other materials may be placed in the compartments 212 of modular bins 206 at a modular sorting station 200, or elsewhere in the materials handling facility, as well. Other materials that may be placed in the compartments 212 of a modular bin may include one or more of, but are not limited to: packaging materials, inserts, labels, coupons, catalogues, etc.

Also note that, while embodiments are generally described in relation to applications for sorting picked items into their respective orders, modular sorting stations 200 and modular bins 206 as described herein may be used in other sorting applications. For example, modular sorting stations 200 and modular bins 206 as described herein may be used to sort single item orders and/or presorted multi-item orders into compartments in the modular bins 206 representing different sizes of packages for packing and shipping the orders, where each modular bin 206 may be configured into compartments to receive orders of one or more items to be packed in packages of a particular size.

Figure 8:
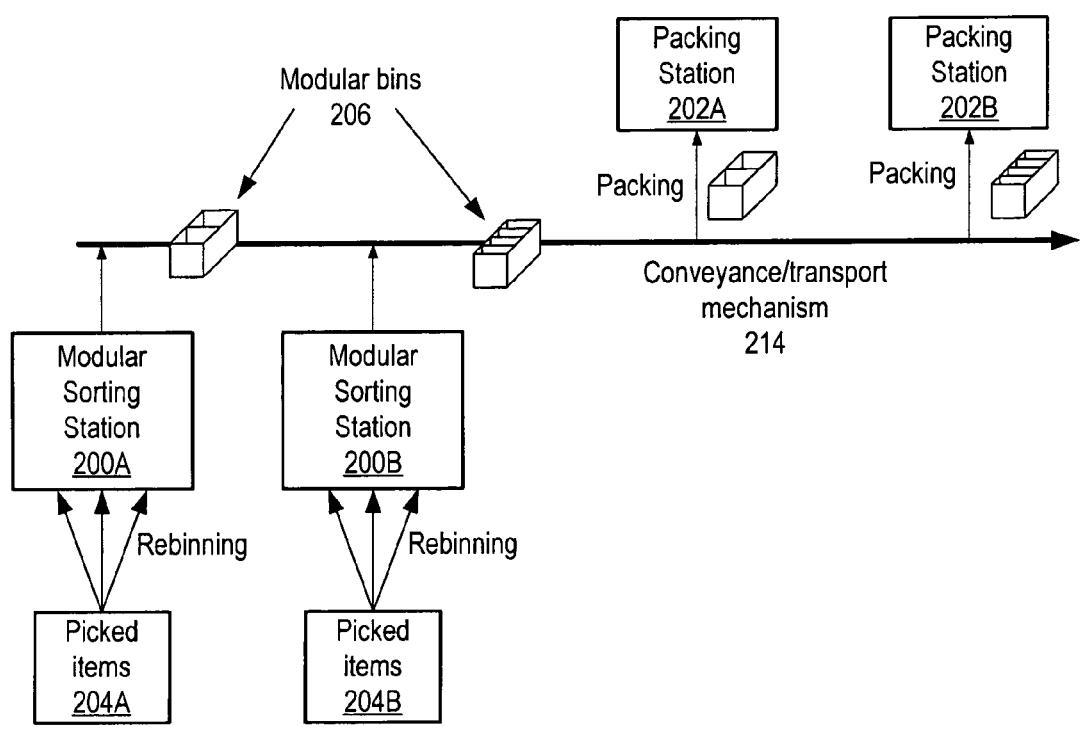
FIG. 8 illustrates an exemplary rebinning and packing configuration where the modular sorting stations are positioned away from the packing stations and modular bins are conveyed from the modular sorting stations to the packing stations according to one embodiment.

In one embodiment, modular sorting station(s) 200 may be positioned at a location away from the packing station(s), either in the same facility or building or, in some materials handling facilities, in a different facility or building. In this embodiment, there may not be a direct association between any particular modular sorting station 200 and any particular packing station. FIG. 8 illustrates an exemplary rebinning and packing configuration where the modular sorting stations are positioned away from the packing stations and modular bins are conveyed from the modular sorting stations to the packing stations according to one embodiment. In this embodiment, when a modular bin 206 is full (e.g., when all items for all orders associated with the modular bin 206 have been picked and placed or "rebinned" in the appropriate compartments), the modular bin 206 may be conveyed by some conveyance/transport mechanism 214 to a packing station 202 configured to pack orders of the size and/or package type that the modular bin 206 is subdivided to hold. As used herein, the size of an order generally refers to the physical dimensions of the assembled items of the order and not to the number of individual items in the order. An order containing a single item of one type may be larger than an order containing several items of other types of items. Note that, in some instances, the physical dimensions of an order may be correlated to the number of items in the order, for example in materials handling facilities in which the inventory primarily consists of types of items of roughly similar sizes. The removed full modular bin 206 may be replaced with an empty modular bin 206 of the same or different configuration as the one removed. The conveyance mechanism 214 may be, but is not limited to, a conveyor belt, rollers, carts (motorized or manually pushed), manual labor (physically carrying the modular bin 206), or a combination of one or more thereof.

In the exemplary configuration illustrated in FIG. 8, modular sorting stations 200A and 200B are positioned away from packing stations 202A and 202B. Incoming picked items 204 are sorted or rebinned into the compartments of the modular bins of modular sorting stations 200A and 200B using one of the methods described above. When a modular bin 206 is full (e.g., when all items for all orders associated with the modular bin 206 have been picked and placed or "rebinned" in the appropriate compartments), the modular bin 206 may be conveyed by conveyance mechanism 214 to a packing station 202. Packing station 202A may receive modular bins 206 subdivided to hold orders of one range of sizes, and packing station 202B may receive modular bins 206 subdivided to hold orders of a different range of sizes. The orders in the modular bins 206 may then be packed for shipping at the packing stations 202. Note that a picked, packed and shipped order does not necessarily include all of the items ordered by the customer; a packed and shipped order may include only a subset of the ordered items available to ship at one time from one inventory-storing location.

Subdividing the sorting stations into modules (modular bins 206), separating the modular sorting stations 200 from the packing stations 202 and conveying full modular bins 206 to the appropriate packing stations may help reduce the batchiness which may occur in configurations where full sorting stations are moved to packing stations. Since the modular sorting station 200 is subdivided into two or more separate units (modular bins 206), a full modular bin 206 may be conveyed to a packing station 202 without having to wait for an order in another modular bin 206 to be filled. Further, sorting picked items into orders may be performed at the modular sorting station(s) 200 using one of the methods previously described, and thus less or no sorting of picked items into orders may have to be performed during picking, simplifying the picking process. A picker may pick items for multiple orders and deliver batches of picked items for multiple orders en masse and unsorted to a modular sorting station 200 for sorting.

Figure 9A:
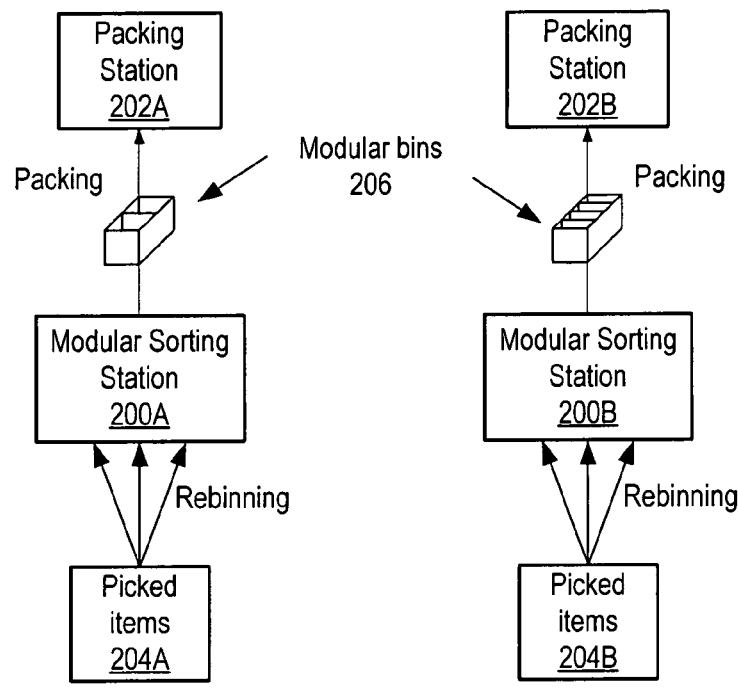
FIGS. 9A and 9B illustrate an exemplary rebinning and packing configuration where the modular sorting stations are positioned adjacent to the packing stations according to one embodiment.
Figure 9B:
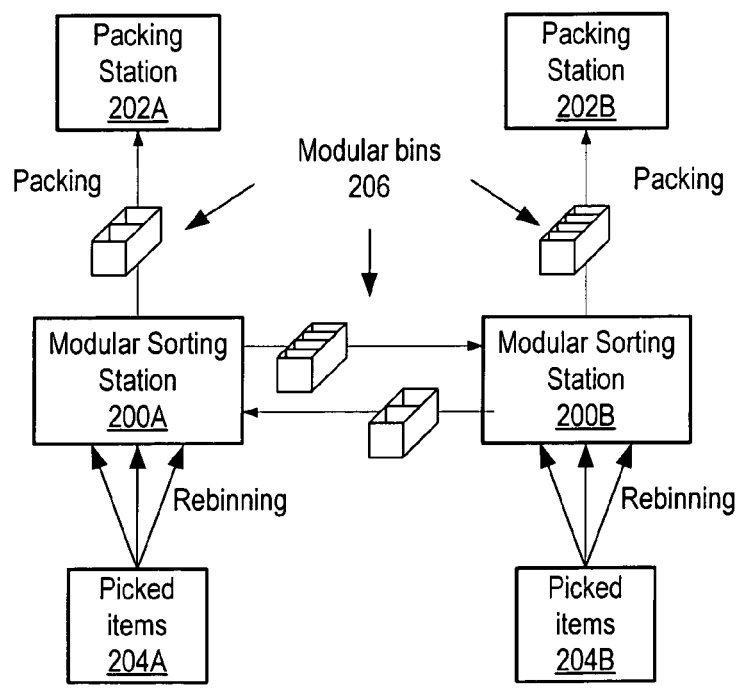

In another embodiment, one or more modular sorting stations 200 may be located adjacent to each of one or more packing stations. In this embodiment, a sorting station 200 may be associated with a particular packing station. FIGS. 9A and 9B illustrate an exemplary rebinning and packing configuration where the modular sorting stations are positioned adjacent to the packing stations according to one embodiment. In this embodiment, in FIG. 9A, picked items 204 for orders may be sorted into their respective orders using one of the methods described above and placed in the compartments 212 of the modular bins 206 assigned to the respective orders on one side of the modular sorting station(s) 200, and agent(s) responsible for packing the orders may remove full modular bins 206 (modular bins for which all items in all orders assigned to the compartments 212 in the modular bins 200 have been received and sorted into their respective compartments 212) from the modular sorting station 200 for packing. The removed full modular bin 206 may be replaced with an empty modular bin 206 of the same or different configuration as the one removed.

In one embodiment, each packing station 202 may be configured to pack orders of a certain range of sizes or of a certain package type, and the modular bins 200 on the modular sorting station(s) 200 associated with the packing station may be subdivided to receive orders specific to that packing station 202. As used herein, the size of an order generally refers to the physical dimensions of the assembled items of the order and not to the number of individual items in the order. An order containing a single item of one type may be larger than an order containing several items of other types of items. Note that, in some instances, the physical dimensions of an order may be correlated to the number of items in the order, for example in materials handling facilities in which the inventory primarily consists of types of items of roughly similar sizes. For example, in FIG. 9A, packing station 202A may be configured for packing orders of one range of sizes, and packing station 202B may be configured for packing orders of a different range of sizes. Modular sorting station 200A may hold modular bins 206 subdivided to receive orders of the range of sizes that packing station 202A is configured to pack, and modular sorting station 202B may hold modular bins 206 subdivided to receive orders of the range of sizes that packing station 202B is configured to pack.

In one embodiment, a modular sorting station 200 may hold modular bins 206 of different configurations, one or more of which may not be configured to hold orders of the range of sizes specific to the packing station 202 associated with or adjacent to the modular sorting station 200. Since the modular bins 206 are removable and portable, an empty, partially full, or full modular bin 206 may be moved from one modular sorting station 200 to another modular sorting station 200 adjacent to a packing station 202 configured to pack orders of the size the modular bin 206 is configured to receive, as illustrated in FIG. 9B. Note that, for both the configuration illustrated in FIG. 8 and the configuration illustrated in FIGS. 9A and 9B, modular bins 206 may also be moved to different packing stations 202 for other reasons, for example to distribute work load if one packing station is busy while another is idle.

One benefit of subdividing modular bins 206 into two or more compartments is that, each time a modular bin 206 is moved from a modular sorting station 200 to a packing station 202, two or more orders may be being moved. In sorting stations where the bins are not subdivided, each bin holds one order, so each movement from a sorting station to a packing station moves only one order to the packing station. Thus, subdivided modular bins 206 may serve to reduce movement between the sorting station(s) 200 and the packing station(s) 202.

For both the configuration illustrated in FIG. 8 and the configuration illustrated in FIGS. 9A and 9B, since the modular bins 206 are removable and portable, modular bins 206 may be moved from one modular sorting station 200 to another modular sorting station 200. This mobility may allow partial sorting and rebinning of items for orders to occur at two or more modular sorting stations. An empty modular bin 206 may be partially filled at one modular sorting station 200; that is, one or more of the compartments in the modular bin 206 may have received none of the items, or only some of the items, for the order assigned to the compartments and not the complete order, while other compartments may have received the complete orders assigned to the compartments. The partially filled modular bin 206 may be moved to another modular sorting station 200 for completion of the orders assigned to the compartments of the modular bin 206, or for continued rebinning of picked items to fill the orders before being moved to yet another modular sorting station 200 to continue rebinning.

In one embodiment, there may be one or more exchange stations for exchanging partially filled modular bins between modular sorting stations 200. In this embodiment, a modular bin 206 partially filled at one modular sorting station 200 may be dropped off at an exchange station and picked up and delivered to another modular sorting station 200 to continue rebinning items to the modular bin 206.

One application in which the ability to move a modular bin 206 from one modular sorting station 200 to another is in "re-picks" or situations where an item was scheduled to be picked from a certain location in stock storage by a certain agent performing picking, but which could not be picked due to, for example, inventory shortage, damage, or agent error. In this situation, it may be possible to pick the needed item, either from another location, or by sending an agent back to the original location. However, sending an agent to a location in stock storage for the sole purpose of retrieving one or just a few items (e.g., all re-picks, which tend to be few) may be expensive in terms of travel time per unit picked. Using an embodiment of a modular sorting station 200 and modular bins 206, an order fulfillment control system may select an agent who is picking items bound for a different modular sorting station 200, but happens to be in the area or zone that a needed item is in, and task that agent with picking the item and adding that item to the agent's other picked items. The modular bin 206 containing the order missing the item may be sent from the original modular sorting station 200 to the modular sorting station for which the second agent is picking, where the missing-item order can be completed. In addition to saving agent travel time during picking, this may also help to avoid situations where only one (re-picked) item is placed in a tote which is then conveyed from the pick areas to the rebin area, which would lower the average number of items per tote. Average items per tote may be an important metric to maximize in materials handling facilities where post-pick conveyor capacity is or may become a bottleneck.

The modularity of the sorting stations 200 may help ensure that such exception-handling situations do not delay processing of all the orders at a particular sorting station while waiting for items to complete orders. Only the orders in a particular modular bin may be delayed while waiting for missing items; other modular bins that have been completed may proceed to a packing station. In addition, embodiments of modular sorting stations 200 may help keep each station and its associated personnel productive, even when one or more orders are missing items or there are other order-specific exceptions, without the need to pause processing at a particular station while exceptions are resolved. Without modularity, either the completion of all orders at a sorting station would be delayed until all items were present, which is a poor use of capital and slows order processing time, or the orders would have to be released from the station one by one, which requires more labor on the part of the agent taking orders out of the sorting station to be packed.

In one embodiment, a modular bin 206 may be configured as a "cartridge" that may be input into an automated packing mechanism which may then automatically remove and package the orders within the compartments of the modular bin 206. Different packing stations may be configured with different automated packing mechanisms that may accept distinct configurations of modular bins 206 for packing. In another embodiment, each compartment within a modular bin may be a cartridge that may be removed and input into an automated packing mechanism. In one embodiment, an order fulfillment control system may provide information to an automated packing mechanism that may inform the packing mechanism as to which compartments in a modular bin 206 are assigned orders, and may also provide other information about the orders in each modular bin 206 to the automated packing mechanism for use in packing the orders.

In some embodiments, the compartments in a modular bin 206 may be, or alternatively may include, packaging material for the orders. In these embodiments, an agent may pick or rebin items straight into packages for the orders, with each package representing one compartment in a modular bin 206. In these embodiments, it may not be necessary to convey the modular bins 206 to packing stations 202 for the items in the orders to be removed from the compartments and placed into packaging. Instead, when the orders in a modular bin 206 are complete, an agent, for example the agent performing sorting and rebinning, may remove each compartment (or package in each compartment) from the modular bin 206, close the package, and send the package to shipping.

In some embodiments, rather than, or in addition to, modular bins including only complete orders being conveyed to packing stations, at least some modular bins including partial or incomplete orders may be conveyed to the packing stations, or alternatively to a different station for performing final sorting of the partial orders into complete orders. In these embodiments, filled modular bins containing partial orders may be conveyed to packing (or other) stations. The partial orders may then be sorted at the packing stations to generate the complete orders and the complete orders placed into packaging. The agent performing packing may, for example, take one or more items picked for an order from a compartment of a first modular bin, and one or more items picked for the same order from a second modular bin, possibly from a different modular sorting station than the first modular bin, and place the two or more items for the order into the same packaging. Thus, two or more parts of an order may be picked, sorted and rebinned into compartments of two or more modular bins at one or more modular sorting stations, the two or more modular bins may be conveyed to a packing station, and the items for the order removed from the compartments of the modular bins and merged into one (or) packaging container for shipping to the customer. In one embodiment, an order fulfillment control system may be configured to direct the agent performing packing in sorting the partial orders from the modular bins into the complete orders in the packaging. Note that the packing (or other) station may be in the same facility as the modular sorting station(s) or, alternatively, in a different facility or building. In the latter case, the modular bins may be transported to the other facility to complete the order processing.

These embodiments may reduce or eliminate the need to complete the orders in the compartments of modular bins at the modular sorting stations. Part of an order may be rebinned into one modular bin and another part into another modular bin, at the same or at different modular sorting stations. The filled modular bins may then be brought together at a later stage, for example at a packing station, where the partial orders may be sorted into complete orders. In addition, it may not be known in advance that a particular item or items to be picked for an order may be oversized for the compartment of a modular bin assigned to that order. The oversized item(s) for orders may be placed into compartments of a modular bin with larger compartments; the other items for the orders may be rebinned into modular bins with smaller compartments, all at one modular sorting station. Thus, the items for an order may be split across two or more modular bins at one modular sorting station "on the fly" and consolidated at the packing station or, alternatively, at another station.

For both automated sorting mechanisms and modular sorting stations, there may be a constraint on the maximum size of items that can be handled. Larger items require larger trays and chutes on automated sorting mechanisms, and larger compartments in modular bins. The maximum size item allowed for either may be set to optimize throughput of the sorting operation. Thus, there may be some items that are too large to be handled by an automated sorting mechanism and/or modular sorting stations in some configurations of a materials handling center as described herein. The method described below allows items picked for orders that are too large to be handled by an automated sorting mechanism and/or modular sorting stations to be integrated with portions of orders including smaller items sorted using any of the other sorting techniques and materials handling configurations described herein.

In some materials handling applications, some orders may include one or more rebinnable items (e.g., items small enough to be rebinned into a compartment of a modular bin) plus one (or possibly more) non-rebinnable item (e.g., an item too large to be rebinned into a compartment of a modular bin). In some embodiments, to handle these cases, the rebinnable items for an order may be sorted and rebinned into a modular bin at a modular sorting station using one of the techniques described herein. There may be an independent source or sources for items that are not rebinnable (e.g. because they are too big). When the modular bin is delivered to a packing station to be packed, the agent performing packing may select the one (or more) non-rebinnable item from an independent source and package all of the items in the order together for shipping to the customer. In these embodiments, it may be the packing agent's responsibility to do the final consolidation of the rebinned items in the modular bins with the non-rebinnable items into a package or packages to be shipped.

In one embodiment, an order fulfillment control system may be configured to direct the packing agent in consolidating the items from the modular bins with the non-rebinnable items. In one embodiment, non-rebinnable items picked for orders may be grouped in a "pile" accessible to the packing station. The agent may select an item from this group and scan or otherwise enter an identifier for the item into the control system. The control system may then direct the agent to the modular bin, and compartment of the modular bin, which holds the rebinnable item(s) for the order the non-rebinnable item was picked for. The agent may then collect all the items and place the items into one or more packages for shipping. Other embodiments may use other techniques for consolidating parts of orders from modular bins with non-rebinnable items from another source.

Since the modular bins are modular and portable, modular bins containing partial and/or complete orders may be transported from one facility to another in different locations and/or buildings to continue order processing, for example from one or more order picking, sorting and rebinning facilities containing stock storage and modular sorting stations to a packing facility containing packing (and possibly shipping) stations. Another exemplary configuration may be to transport modular bins containing partial orders from one or more facilities where partial orders are picked and rebinned into the modular bins to another facility configured to complete the sorting of the partial orders from the modular bins into complete orders for shipping. As another example, the orders for a modular bin may be partially filled in one facility containing stock storage, and then transported to another facility to continue or complete the orders in the modular bins. For example, one facility may include stock storage for CDs or similar small items, while another facility may include stock storage for larger items. CDs may be picked, sorted, and rebinned into modular bins at a modular sorting station(s) in the first facility, and when one or more of the modular bins is completed in that facility (when all items in that facility for the orders have been rebinned into the modular bins), the modular bins may be transported to the other facility that has the larger items for the orders for completion of the orders. As another example, items may be picked, sorted and rebinned into modular bins at one facility that has some of the items for the orders in stock, and then the modular bins may be transported to another facility that has other items for the order in stock where the rebinned items may be combined with additional items picked from the second facility. Note that a facility that the modular bins containing partial and/or complete orders are transported to does not necessarily have to have "pickable" inventory (stock storage); for example, the facility may only contain packing (and possibly shipping) stations, and the final consolidation and processing of the partial and/or complete orders from the modular bins may be completed at the facility.

The modularity and portability of the modular bins as described herein, in addition to the compartmentalization of the modular bins, may allow the implementation of a "rebin at pick" mechanism in at least some materials handling applications. In rebin at pick, an agent may take one or more modular bins along when picking from stock storage, for example one or more modular bins on a cart, or alternatively a modular bin on wheels as illustrated in FIG. 6C. As items for orders are picked, the agent may "rebin" the items directly into their respective compartments in the modular bins. In one embodiment, an order fulfillment control system may direct the agent as to which compartment an item is to be placed. The rebin at pick mechanism allows sorting and rebinning to be performed directly during picking, and thus may eliminate the necessity for an independent sorting/rebinning process at a sorting station in some applications, and thus the need for a separate sorting department and/or sorting stations. Partial and/or complete orders may be sorted and rebinned into modular bins during the pick operation; partial orders from modular bins may be consolidated at the packing station(s) to complete the sorting process.

One quality assurance problem that is common among materials handling applications is minimizing misplacement of picked items into wrong orders. Embodiments of modular bins as described herein may provide a mechanism or mechanisms to help insure that items have not been rebinned into the wrong slot(s). One such mechanism is for an order fulfillment control system to determine how many units (items) are to be placed in each compartment of a modular bin. For example, the control system may designate a first modular bin to receive orders of one item, a second modular bin orders of two items, a third modular bin orders of three items, etc. When sorting and rebinning to a modular bin is complete, an agent may manually inspect the modular bin to verify that the correct number of items is in each compartment of the modular bin (e.g. one in the compartments of the first modular bin, two in the compartments of the second modular bin, and so on). If the agent spots a compartment with too many or too few items, the agent knows that an error has occurred in sorting and rebinning and can act to correct the error. Alternatively, an automated mechanism may be used to verify the correct number of items are in each compartment of a modular bin.

Some embodiments of modular bins and modular sorting stations as descried herein may use a "put-to-light" or similar mechanism that automatically detects when items are placed into compartments of the modular bins. The mechanism may automatically detect if a wrong item is placed into a compartment or an item is placed into a wrong compartment, and indicate to the agent that an error in rebinning has been made, and/or may indicate that an item has been placed into the correct compartment. For example, there may be a "light tree" or bar of lights either on the modular bin or alternatively around the place where the modular bin is in the modular sorting station that may detect items when placed in compartments and indicate to the agent if the placement was correct or incorrect.

In one embodiment, items, orders, modular bins, modular sorting stations, compartments within the modular sorting stations, and/or packaged orders, and possibly other components of the materials handling facility, may be assigned identifiers or codes. In one embodiment, each component may be tagged or marked with its identifier. Alternatively, some components (such as modular bin compartments) may not be tagged or marked. An identifier may uniquely identify a component, such as an order, modular sorting station or modular bin, or may identify a type of the component, such as a type of an item.

For items, identifiers may uniquely identify items (for example a serial number may be used as an identifier for an item), or alternatively may identify the type of an item (thus, all items of that particular type will have the same identifier). Item identifiers that may be used may include one or more of, but are not limited to: bar codes, radio frequency identification (RFID) tags, Universal Product Codes (UPC), Stock-Keeping Unit (SKU) codes, serial numbers, and/or other designations (including proprietary designations).

In one embodiment, each agent (e.g., pickers, sorters/rebinners, packers, shippers, etc.) in the materials handling facility may be assigned an identifier or code that uniquely identifies the agent.

Any or all of these identifiers or codes may be used in an order fulfillment control system to facilitate and control the various functions of the materials handling facility, such as picking, sorting and rebinning, packing and shipping.

Figure 10:
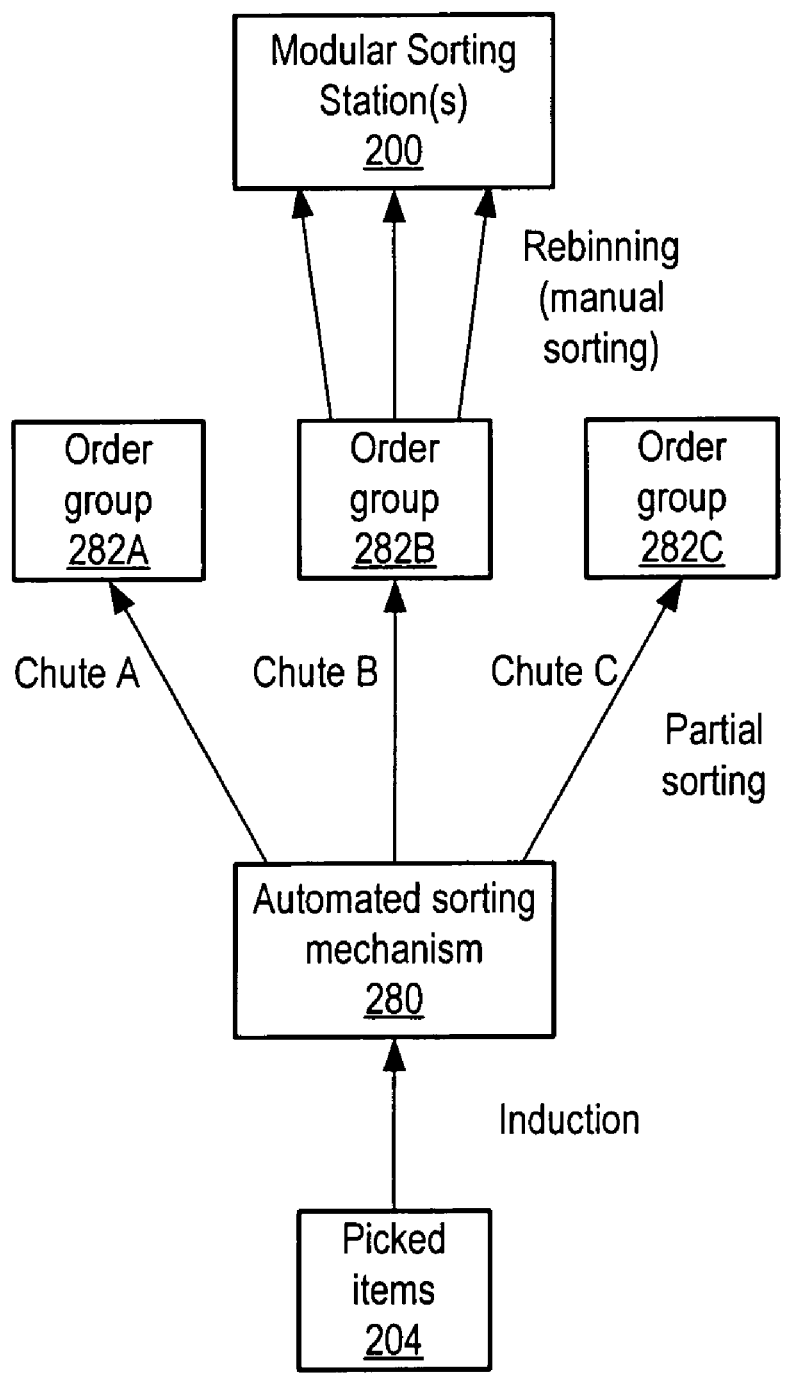
FIG. 10 illustrates an automated sorting mechanism performing partial sorting of picked items into groups of orders according to one embodiment.

FIG. 10 illustrates an automated sorting mechanism performing partial sorting of picked items into groups of orders according to one embodiment. In this embodiment, an automated sorting mechanism 280 may perform a partial sort of picked items into groups 282 of orders, which may then be sorted manually into compartments of modular bins at modular sorting station(s) 200. Picked items 204 may be inducted into an automated sorting mechanism 280. The automated sorting mechanism 280 may then partially sort the picked items into two or more groups 282 each including the items picked for two or more orders. The items in each group 280 may be output from the automated sorting mechanism 280 in a chute that may be assigned to that group of orders by an order fulfillment control system. The items in each group 280 may then be manually sorted into the compartments assigned to their respective orders in one or more modular bins at one or more modular sorting stations 200.

As an example, an automated sorting mechanism might partially sort a batch of 20,000 orders into 2000 groups, one group per chute, with each group containing 10 orders of intermingled items. A rebin-type manual sort as described herein may then be performed on each group of orders to separate the group into its 10 individual orders in compartments of the modular bins.

The cost of an automated sorting mechanism may be at least partially a function of the number of chutes, so the cost of a manual sorting mechanism may be minimized by configuring the mechanism to perform a partial sort into groups of orders instead of sorting picked items into their individual orders. In addition, the batch size (or the equivalent for a stream of items) may be flexibly increased or decreased in response to seasonal or other variations in order processing characteristics, without the need to make expensive changes to the fixed mechanical infrastructure.

Figure 11:
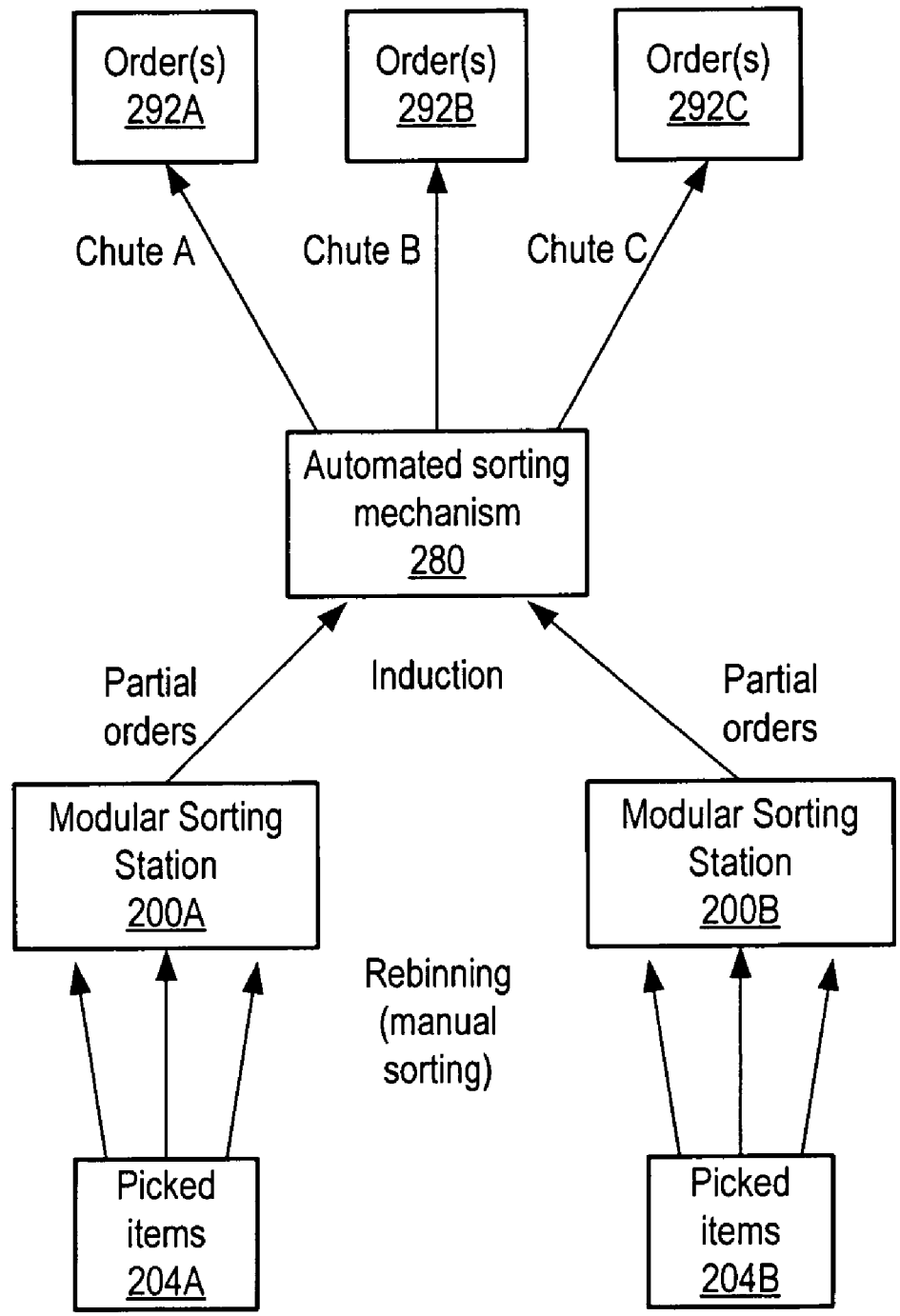
FIG. 11 illustrates an exemplary configuration for a materials handling facility where picked items are sorted and rebinned at modular sorting station(s) upstream of an automated sorting mechanism into partial orders in the compartments of the modular bins and then bundled and inducted into the automated sorting mechanism.
Figure 12:
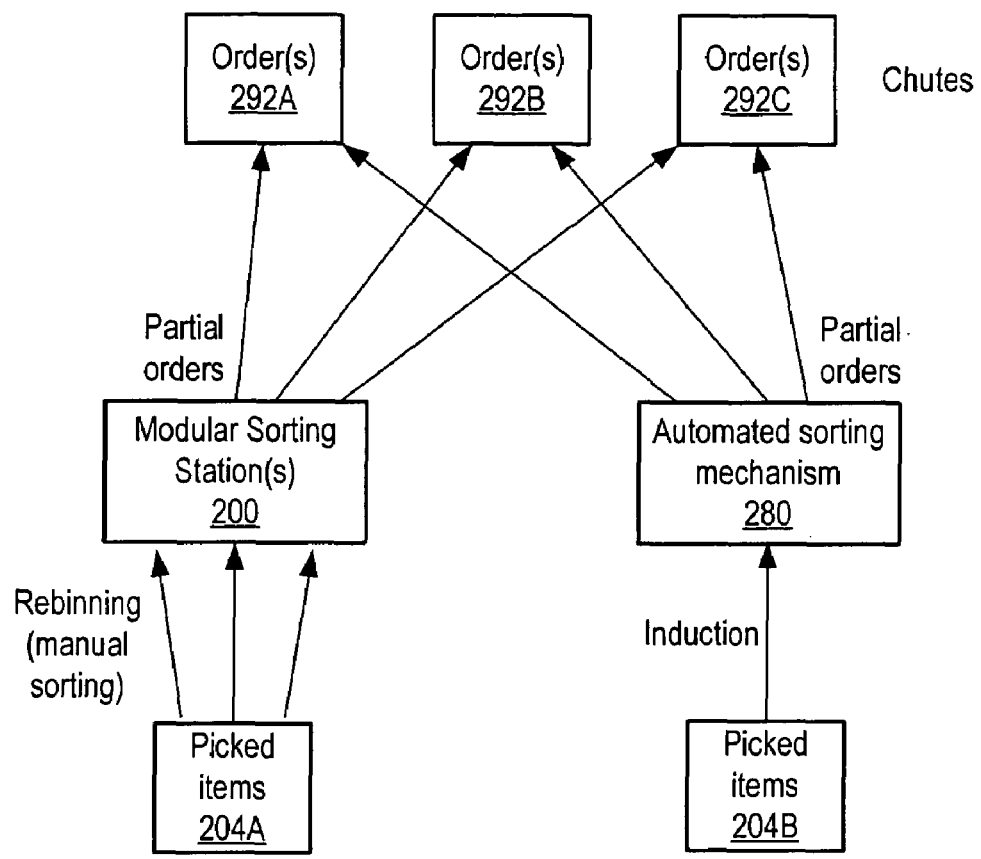
FIG. 12 illustrates an exemplary configuration for a materials handling facility where some picked items are sorted and rebinned into partial orders in modular bins at modular sorting station(s) while other picked items are sorted by an automated sorting mechanism into partial orders in the output chutes of the sorting mechanism.

FIG. 10 illustrates a configuration for a materials handling facility where an automated sorting mechanism performs partial sorting "upstream" of the modular sorting stations into groups of orders, which are then sorted and rebinned at the modular sorting stations. Automated sorting mechanisms may be used in other configurations with embodiments of modular sorting stations as described herein. FIGS. 11 and 12 illustrate two exemplary alternative configurations. Note that two or more of the exemplary configurations illustrated in FIGS. 10 through 12, or other possible configurations, may be implemented, or combined, in a materials handling facility.

FIG. 11 illustrates an exemplary configuration for a materials handling facility where picked items 204 are sorted and rebinned at modular sorting station(s) 200 upstream of an automated sorting mechanism 280 into partial orders in the compartments of the modular bins. The one or more items in the partial orders may then be bundled, if necessary, and inducted into the automated sorting mechanism 280 to be sorted and merged into complete orders 292 in output chutes of the automated sorting mechanism 280. In one embodiment, a modular bin, when complete (when the one or more items for each of the (partial) orders assigned to the compartments of the modular bin have been sorted and rebinned into the modular bin), may be carried or conveyed from the modular sorting station 200 to an induction station of the automated sorting mechanism 280 for bundling of the items of the partial orders in the compartments of the modular bin and induction of the bundled partial orders into the automated sorting mechanism 280. Note that some or all orders may be completed in a modular bin at a modular sorting station 200. Items in orders completed at a modular sorting station 200 may be bundled and inducted to the automated sorting mechanism 280 as well, or alternatively may be conveyed directly to the output chutes of the automated sorting mechanism 280 or to a packing station.

Conventional automated sorting mechanisms may have an induction station where trays on a conveyor pass the station. In some circumstances, an automated sorting mechanism may be a "bottleneck" in a materials handling facility due to a limit on the number of trays that pass the induction station in a period, for example in a minute or an hour. In conventional configurations, each tray of the automated sorting mechanism receives one item. The configuration illustrated in FIG. 11 allows two or more items in a partial order to be bundled together and inducted as a bundle placed in one tray at the induction station of the automated sorting mechanism 280, and thus may reduce the number of trays used per order, increasing throughput at the automated sorting mechanism 280. By allowing two or more items for an order to be placed on one tray, the capacity of the automated sorting mechanism 280, and thus the materials processing facility, may be increased.

FIG. 12 illustrates an exemplary configuration for a materials handling facility where some picked items 204 are sorted and rebinned into partial orders in modular bins at modular sorting station(s) 200 while other picked items are sorted by an automated sorting mechanism 280 into partial orders in the output chutes of the sorting mechanism 280. When the partial orders in a modular bin have been completed, the modular bin may be carried or conveyed to the output chutes of the automated sorting mechanism 280 and the partial orders from the compartments of the modular bin may be placed in the output chutes of the sorting mechanism 280 with the partial orders sorted by the sorting mechanism 280. Each partial order from the modular bin may be placed in a chute with the rest of the order sorted by the automated sorting mechanism 280. In one embodiment, an order fulfillment control system may direct an agent as to which chute each partial order from the modular bin is to be placed. Thus, the automated sorting mechanism 280 may be bypassed for at least some items in the orders, which may reduce the number of trays used on the sorting mechanism 280. The capacity of the automated sorting mechanism 280, and thus the materials processing facility, may be increased. In addition, in some materials handling applications, sorting and rebinning at a modular rebin station as described herein may be optimal for sorting smaller sizes of items, while an automated sorting mechanism may be optimal for sorting larger sizes of items. The exemplary mechanism illustrated in FIG. 12 may allow both sorting mechanisms to be used for sorting their respective optimally sized items, and then merging the orders in the output chutes.

Note that some or all orders may be completed in a modular bin at a modular sorting station 200 in the exemplary configuration of FIG. 12. The modular bin may be carried or conveyed to the output chutes of the automated sorting mechanism and the completed orders placed in the chutes, or alternatively the completed orders may be conveyed or carried directly to a packing station.

Figure 13:
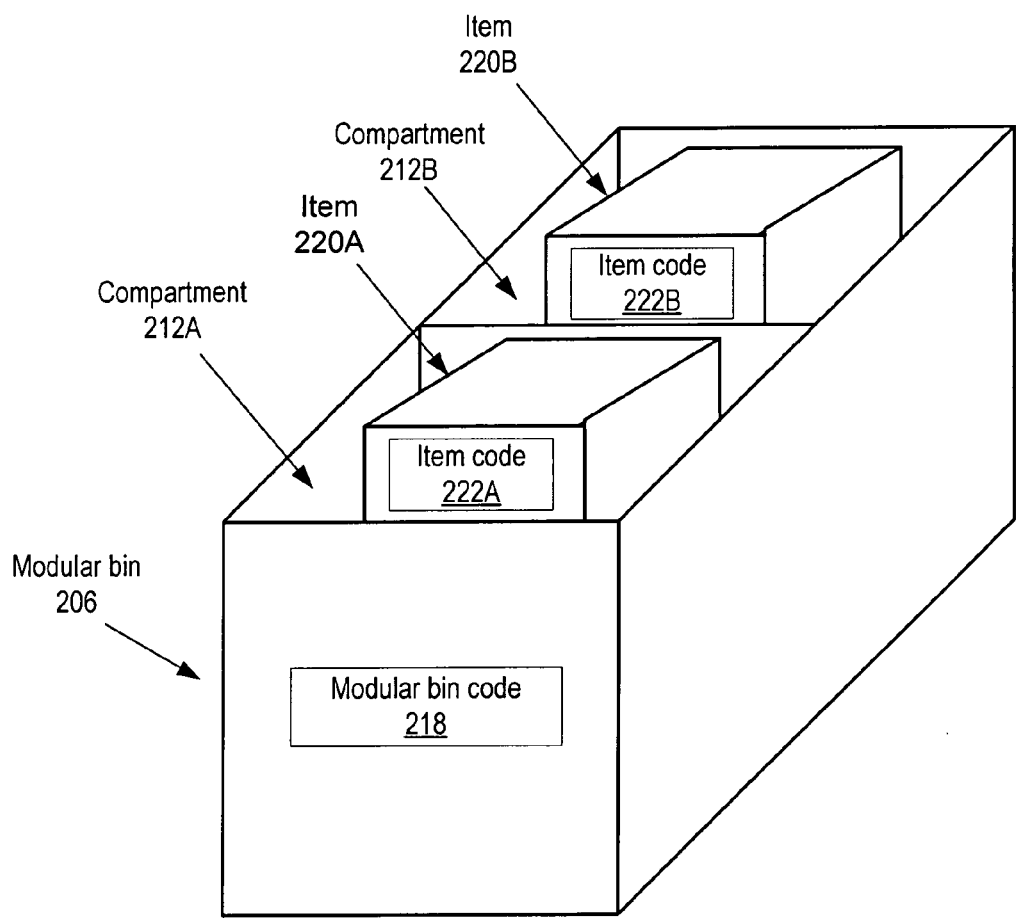
FIG. 13 illustrates a modular bin that is tagged with a modular bin code that uniquely identifies the modular bin according to one embodiment.

FIG. 13 illustrates a modular bin 206 that is tagged with a modular bin code 218 that uniquely identifies the modular bin 206 according to one embodiment. Compartment 212A may be assigned to one order, and compartment 212B may be assigned to another order. Each order may be identified by a unique order identifier in the control system. In this example, an item 220A for the order assigned to compartment 212A has been picked and rebinned in compartment 212A, and an item 220B for the order assigned to compartment 212B has been picked and rebinned in compartment 212B. Item 220A is identified either by type or uniquely by item code 222A, and item 220B is identified either by type or uniquely by item code 222B.

In one embodiment, compartments 212 may each be assigned a unique identifier, and may be tagged or marked with that unique identifier. Other methods may be used to identify compartments. For example, in one embodiment, each compartment 212 of a modular bin 206 may be assigned a compartment number in that bin. For example, in the modular bin 206 illustrated in FIG. 13, compartment 212A may be "compartment 1" and compartment 212B may be "compartment 2" of modular bin 206 with modular bin code 218. For a modular bin subdivided into, for example, eight compartments, the compartments may be identified as compartments 1 through 8 of the modular bin. In this example, a compartment of a modular bin may be uniquely identified by a combination of the modular bin code 218 of the modular bin 206 and the compartment number of the compartment.

In one embodiment, when an agent receives item 220A at the modular sorting station, the agent may scan or otherwise enter the item code 222A into the control system. The control system may then associate the item 220A by its item code 222A to an order associated with compartment 212A. Note that the order may be assigned an order identifier or code for use by the control system. The control system may then direct the agent to place the item 220A into compartment 212A of modular bin 206. In one embodiment, the compartment 212A may be specified by a compartment code unique to that compartment. In one embodiment, the compartment 212 may be specified using a combination of the modular bin code 218 that uniquely identifies the modular bin 206 and a compartment number (e.g., compartment 1).

In one embodiment, there may be more than one modular sorting station, each holding one or more modular bins 206. In this embodiment, each modular sorting station may be uniquely identified by a modular sorting station code. When rebinning an item 220, the destination compartment 212 for the item 220 may be specified by modular sorting station code, modular bin code, and compartment code or, alternatively, compartment number.

These identifiers or codes may, in one embodiment, be used in conjunction with an order fulfillment control system to direct or assist in the picking, rebinning, packing and/or shipping operations of the materials handling facility. In one embodiment, tags or codes that specify the identifiers and are attached to various components may be readable by fixed or mobile scanning devices during the picking, rebinning, packing and/or shipping operations. These scanning devices may be able to communicate via wireless or wired connections to one or more control system stations positioned in the materials handling facility. Alternatively, identifiers may be manually entered into the control system, for example using a keyboard or other input device. During rebinning, the item codes may be used by the control system, in conjunction with the order identifiers, modular sorting station codes, modular bin codes, and/or compartment codes or numbers in directing the agent(s) in rebinning items into compartments of modular bins assigned to the orders for which the items were picked.

Figure 14:
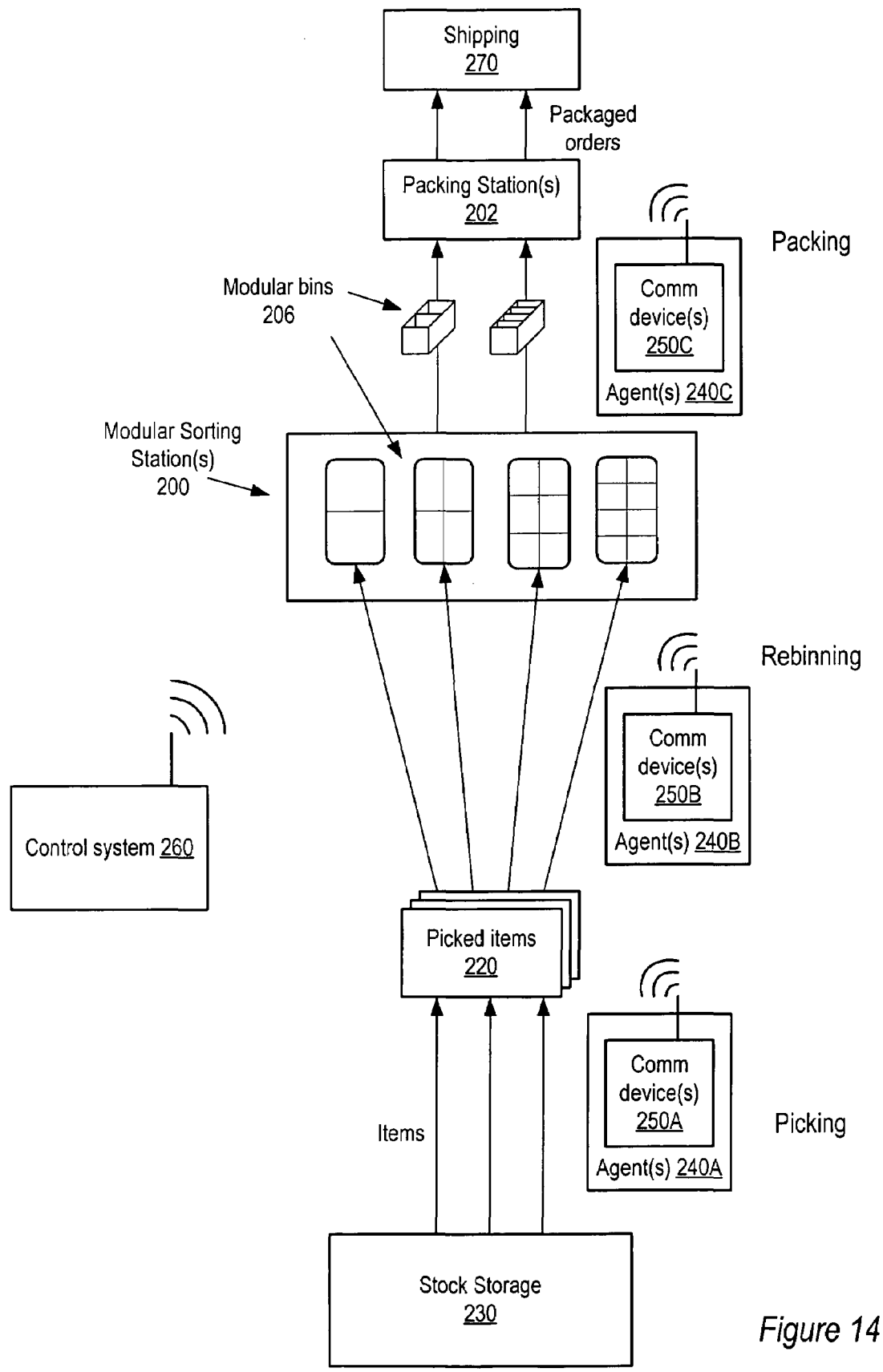
FIG. 14 illustrates operations of an exemplary materials handling facility implementing modular sorting stations and a control system according to one embodiment.

FIG. 14 illustrates operations of an exemplary order fulfillment center implementing modular sorting stations and a control system according to one embodiment. In this embodiment, at least some operations of the materials handling facility may be directed, controlled, monitored, and/or recorded by an order fulfillment control system 260. Control system 260 may include hardware and software configured to direct employees of the materials handling facility (agents 240) in the various operations of the materials handling facility including one or more of, but not limited to: picking, sorting and rebinning, packing, and shipping. The hardware of control system 260 may include, but is not limited to, one or more of any of various types of devices, including, but not limited to, personal computer systems, desktop computers, laptop or notebook computers, mainframe computer system(s), workstations, network computers, storage systems, printers, or other devices.

Communication devices 250 may be configured to communicate with control system 260, for example via radio communication, wireless networking, and/or a wired communication protocol, to convey instructions from control system 260 to agents 240 as to what actions to perform within the materials handling facility. Communication devices 250 may include one or more of, but are not limited to: handheld devices, devices worn by or attached to the agents, and devices integrated into or mounted on any mobile or fixed equipment of the materials handling facility such as push carts, bins, totes, racks, shelves, tables, and work benches. Communication devices 250 may include one or more of, but are not limited to: personal computer systems, desktop computers, rack-mounted computers, laptop or notebook computers, workstations, network computers, "dumb" terminals (computer terminals with little or no integrated processing ability), Personal Digital Assistants (PDAs) or other handheld devices, proprietary devices, printers, or any other devices suitable to communicate with control system 260. In general, a communication device 250 may be any device that can communicate with control system 260 and convey instructions to agents 240. In one embodiment, at least some of the communication devices 250 may be configured to scan or otherwise read or receive codes or identifiers of various components in the materials handling facility and to communicate the entered codes to the control system for use in directing agents 250 in the various operations of the control center. Components may include one or more of, but are not limited to, items, orders, modular sorting stations, modular bins, and compartments of modular bins.

In picking, in one embodiment a communication device 250A may receive a list of items to be picked from stock storage 230, and may present the items to pick to an agent 240A via a display portion of the device such as a screen. Additional information, such as location information for the items to be picked and information on the orders that the picked items are for, may also be displayed. Agent 240A may then pick the items 220 from stock storage 230. The picked items 220 may, for example, be placed in a tote or totes, which may be placed on a push cart or other suitable device for conveying picked items 220 in the materials handling facility. In some embodiments, a tote may be configured to receive items from one order or, alternatively, mixed items from several orders.

Agent(s) 240 may convey picked items 220 to one or more modular sorting stations 200 to be sorted into their respective orders in the compartments of the modular bins 206 on the modular sorting station(s) 200. Picked items 220 may be received in batches or in a stream at the modular sorting station(s) 200. These incoming items may be manually sorted for rebinning into the appropriate compartments designated for receiving their respective orders in the modular bins 206, or alternatively using an automated sorting mechanism to partially sort the orders into groups of orders which many then be manually sorted for rebinning into the appropriate compartments.

As previously described for FIG. 6, in manual sorting, an agent or agents 240B performing the sorting and rebinning may sort the picked items 220 into their respective orders at the modular sorting station 200. In the embodiment illustrated in FIG. 14, the sorting may be facilitated by control system 260. In one embodiment, an agent 240B may use a communication device 250B in communication with control system 260 to enter an item code for an incoming picked item into the control system 260, and the control system 260 may then direct the agent in placing the item into a particular compartment of one of the modular bins 206 assigned to an order for which the item was picked.

As previously described for FIG. 6, in one embodiment, picked items 220 may be inducted into an automated sorting mechanism for partial sorting into groups of two or more orders. In one embodiment, the automated sorting mechanism may read the item codes from the incoming picked items 220 to sort the items into groups of orders. The automated sorting mechanism may be configured to communicate with control system 260 to receive information about the orders to facilitate the automated sorting of the items 220 into groups of orders. One or more agents 240B may then sort the items in the groups of orders from the automated sorting mechanism into the compartments of the modular bins 206 on the modular sorting station(s) 200 assigned to their respective orders to complete the sorting of the orders. Agent(s) 240B may use communication device(s) 250B to communicate with control system 260 to direct the agent(s) 240B as to which compartments in which modular bins 206 the items are to be placed.

Note that the agents 250A performing picking may be the same agents 250 that perform sorting and rebinning. Alternatively, particular agents 250A may perform picking, and different agents 250B may perform the sorting and rebinning.

When a modular bin 206 of modular sorting station(s) 200 is filled (e.g., when all items for all orders associated with the modular bin 206 have been picked and placed or "rebinned" in the appropriate compartments), the modular bin 206 may be moved from the modular sorting station(s) 200 to a packing station 202 for packing. In one embodiment, the control system 260 may track items being placed into each modular bin 206 to fill the orders assigned to the compartments of the modular bin 206, and may detect when a modular bin is full (e.g., when all orders assigned to the compartments in the modular bin 206 have been completed), and may notify an agent at the modular sorting station 200, or alternatively an agent at a packing station 202, that the modular bin 206 is ready to be packed. The removed modular bin 206 may then be replaced by an empty (or partially filled) modular bin 206 of the same or a different configuration as the removed modular bin 206 on the modular sorting station 200. In one embodiment, the control system 260 may then assign new orders to be filled to the compartments of the empty modular bin 206.

As previously described for FIG. 8, in one embodiment, packing station(s) 200 may be located away from packing station(s) 202, and modular bins ready for packing may be conveyed from the modular sorting station(s) 200 to the packing station(s) via some conveyance mechanism. Different packing stations 202 may be configured to pack orders of different sizes and/or in different package types, so modular bins 206 of particular configurations for receiving particular sizes of orders or orders to be packaged in particular types of packages may be conveyed to packing stations 202 configured to pack the orders of the size or type contained in those modular bins 206.

As previously described in FIGS. 9A and 9B, in one embodiment, one or more packing station 200 may be adjacent to and associated with each packing station 202. In this embodiment, when a modular bin 206 on the modular sorting station(s) 200 adjacent to a packing station 202 is ready for packing, an agent 240C working at that packing station 202 may move the modular bin 202 to the packing station 202 for packing the order(s) in the compartment(s) of the modular bin 206. In one embodiment, if the modular bin 206 is configured to receive orders of a different size or to be packaged in a different type of packaging that the packing station 202 is configured to pack, the modular bin 206 may be moved to a different packing station 202 for packing.

Note that modular bins 206 may also be moved to different packing stations 202 for other reasons, for example to distribute work load if one packing station is busy while another is idle.

Agents 250C performing packing may use communication devices 240C in communication with control system 260 to direct the packing of the orders in the modular bins 206. For example, an agent 240C may scan or otherwise enter a modular bin code for a modular bin 206, or alternatively compartment codes for the compartments in the modular bin 206, to receive information on the orders in the compartments of the modular bin 206.

Packaged orders may be moved from the packing station(s) to shipping to be shipped to customers. Note that control system 260 may be accessed by agents working in shipping using communication devices similar to the ones described above to direct the shipping of the orders to the customers.

As previously described, picked items 220 may, for example, be placed in a tote or totes, which may be placed on a push cart or other suitable device for conveying picked items 220 in the materials handling facility. In some embodiments, an agent 240A may pick items directly into a modular bin 206. These embodiments may allow at least partial sorting of orders to be performed during the pick operation, as the items for the orders are picked. In one embodiment, an agent 240A performing picking may pick all the items as indicated by the control system 260 directly into one or more rebin modules 206. In one embodiment, agent 240A may be assigned a "pick zone" in the stock storage area. The agent 240A may be given a list of items to pick including only items in the pick zone by the control system 260, or alternatively may pick only the items from the list of items provided by the control system 260 that are in the assigned pick zone. In one embodiment, the control system 260 may direct the agent 240A as to which compartment in the modular bin(s) 206 each picked item is to be placed, thus sorting the items into control system-directed slots as they are picked. In another embodiment, agent 240A may place the picked items into randomly selected compartments in the modular bins 206, one item per compartment, and the control system 260 may record which compartments hold which items using some mechanism. For example, agent 240A may use communication device 250A to scan a barcode on the compartment when a particular item is placed in the slot to correlate the compartment to the picked item. As another example, agent 240A may manually enter a compartment identifier into control system 260 via communication device 250A to correlate the compartment to a picked item.

Thus, modular sorting stations 200 and modular bins 206 may enable at least partial sorting of orders during the pick operation in some embodiments. In many if not most cases, sorts during pick performed as described above will be partial sorts, because the number of orders than can be fulfilled by picking all items from one pick zone may be relatively small. Partial sorting during the pick operation may not be practical without modular sorting stations 200 and modular bins 206 because an optimally sized sorting station may be too large for an agent 240A to carry around as they move from location to location in the materials handling facility.

When all items which the agent 240A has been directed to pick by the control system 260 have been picked and placed into compartments of modular bin(s), the agent 240A may deliver the modular bin(s) to sorting station(s) 200 as directed by the control system 260. Sorting of the picked items into their respective orders may then be completed at the sorting station(s) 200 as directed by the control system 260. In one embodiment, picked items for an order delivered to a sorting station 200 in two or more modular bins 206, which may have been delivered to the sorting station 200 from two or more pick zones, may be combined into one compartment of one modular bin 206 at a sorting station 200. In one embodiment, a modular bin 206 partially completed in one pick zone may be delivered to another pick zone to continue picking of items for orders in that pick zone.

Figure 15:
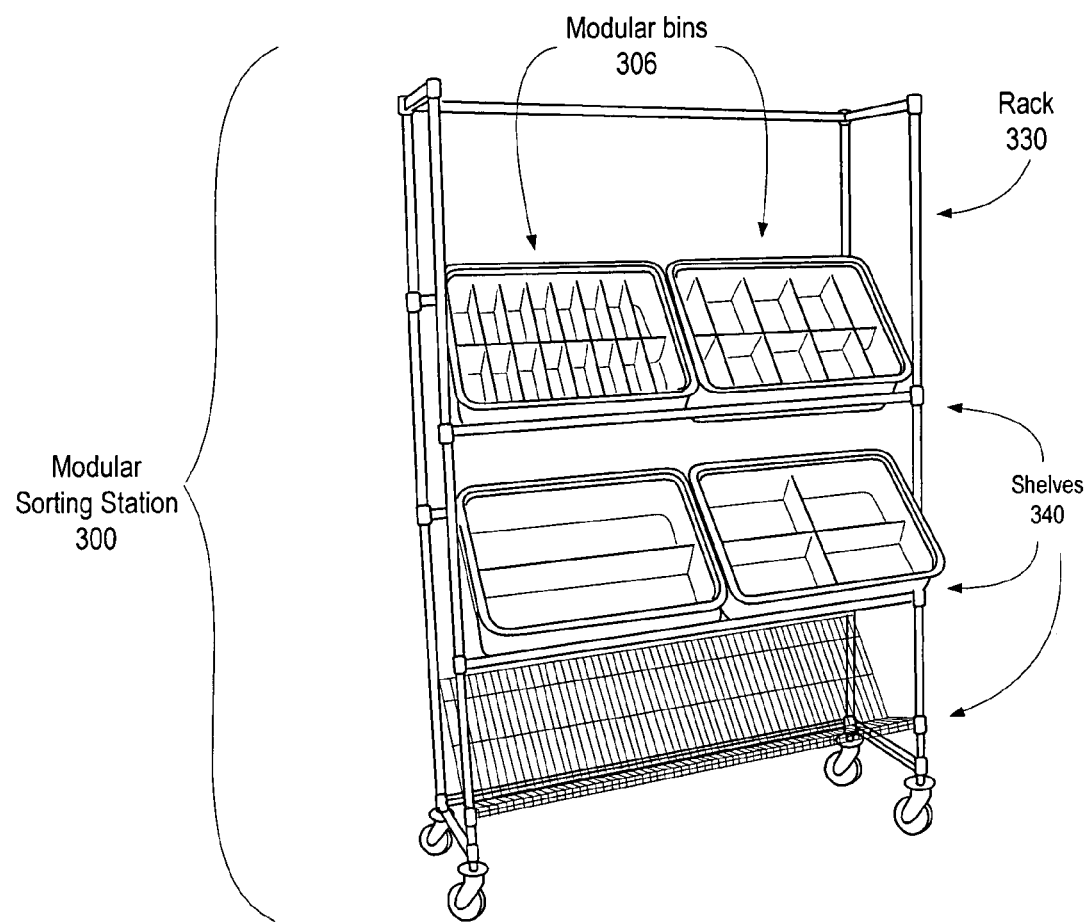
FIG. 15 illustrates an exemplary physical configuration of a modular sorting station unit according to one embodiment.

FIG. 15 illustrates an exemplary physical configuration of a modular sorting station unit according to one embodiment. Modular sorting station 300 is exemplary and is not intended to be limiting. Modular sorting station 300 may include one or more shelves 330 mounted on a rack 330. Rack 330 may be mounted on wheels, rollers, or coasters so that the modular sorting station 300 may be moved, if necessary or desired. The wheels, rollers, or coasters may be lockable.

In one embodiment, one or more shelves 330 may be configured to hold modular bins 306, while one or more other shelves 330 may be configured for other uses. For example, the bottom shelf of the exemplary modular sorting station 300 of FIG. 15 may be difficult to access for rebinning items into compartments of modular bins 306, so modular bins 306 may not be placed on the bottom shelf, which may be used for other purposes.

Each shelf 330 may be configured to hold one or more removable and replaceable modular bins 306. In this exemplary configuration, each of the top two shelves is configured to hold two modular bins 306, so the modular sorting station is configured to hold four modular bins 306. Note that other embodiments of a modular sorting station 300 may be configured to hold other numbers of modular bins on shelves 330, and/or may include a different number of shelves 330 configured to hold modular bins 306. Shelves 330 may be angled or tilted to provide easier access to modular bins 306. In one embodiment, shelves 330 may be adjustable within the rack; for example the shelves may be adjustable to move up or down on the rack, or to be tilted at different angles.

Each modular bin 306 may be, but is not necessarily, partitioned or subdivided into two or more compartments. In one embodiment, each compartment in a modular bin 306 is of the same or similar size. In one embodiment, the partitions of a modular bin 306 may be adjustable and/or removable, allowing the modular bin 306 to be reconfigured to receive items and orders of different sizes. In another embodiment, the partitions may be fixed and thus not adjustable or removable. Note that a modular bin 306 may not include any partitions, and thus essentially includes only one "compartment".

Components of modular sorting station 300 may be marked or tagged with identifiers or codes that uniquely identify the components in the materials handling facility. For example, rack 330 may be marked or tagged with a code that uniquely identifies the modular sorting station 300, and each modular bin 306 may be marked or tagged with a code that uniquely identifies the modular bin 306.

In one embodiment, a control station may be coupled to, or situated near or adjacent to, the modular sorting station 300. The control station may be configured for communicating with an order fulfillment control system for directing the rebinning operation, and/or for other purposes.

The various components of a modular sorting station 300 and modular bins 306 may be constructed of any of a variety of materials, including one or more of, but not limited to, various metals, plastic, and wood.

Figure 16:
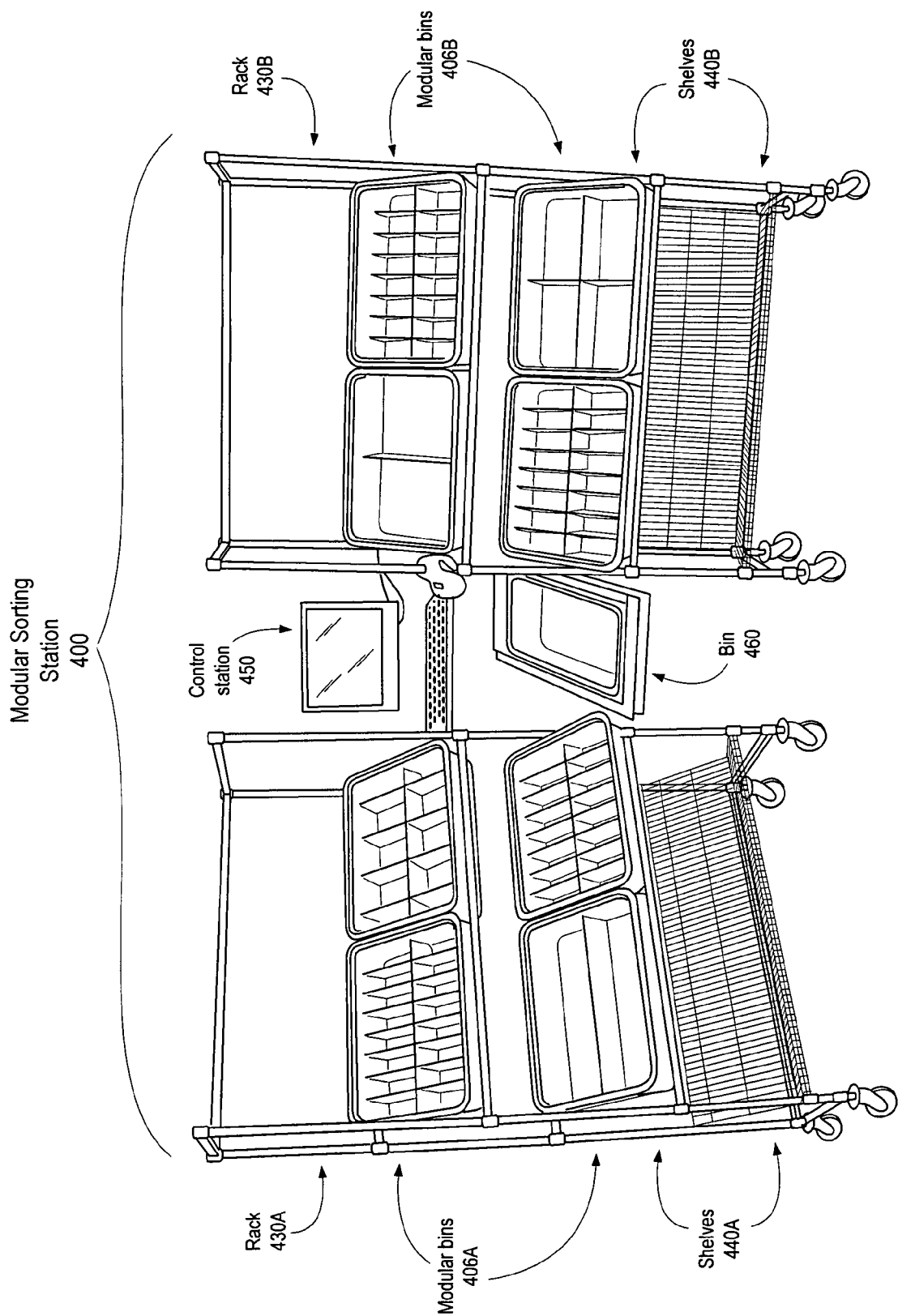
FIG. 16 illustrates an exemplary physical configuration of a modular sorting station where two modular sorting station units are combined to form one modular sorting station, according to one embodiment.

FIG. 16 illustrates an exemplary physical configuration of a modular sorting station where two modular sorting station units similar to the one illustrated in FIG. 15 are combined to form one modular sorting station, according to one embodiment. Modular sorting station 400 is exemplary and is not intended to be limiting. In this embodiment, rebin racks 430A and 430B, which may each be similar to the modular rebin rack unit described in FIG. 15, may be positioned near or adjacent to each other. The racks may or may not be physically coupled to each other.

In this exemplary configuration, a control station 450 may be coupled to one or both of the racks 430, or alternatively may be situated adjacent to or near modular sorting station 400. The control station may be configured for accessing an order fulfillment control system for directing the rebinning operation, and/or for other purposes. Other configurations may not include a control station 450, or may include more than one control station 450.

In this exemplary configuration, a bin 460 may be coupled to one or both of the racks 430, or alternatively may be situated adjacent to or near modular sorting station 400. Other configurations may not include a bin 460, or may include more than one bin 460. Bin 460 may be intended for one or more of any of a variety of uses, for example to receive damaged items and/or wrongly picked items, items that were picked and delivered to the modular sorting station 400 for which, during rebinning, it is discovered that the wrong item was picked.

Figure 17:
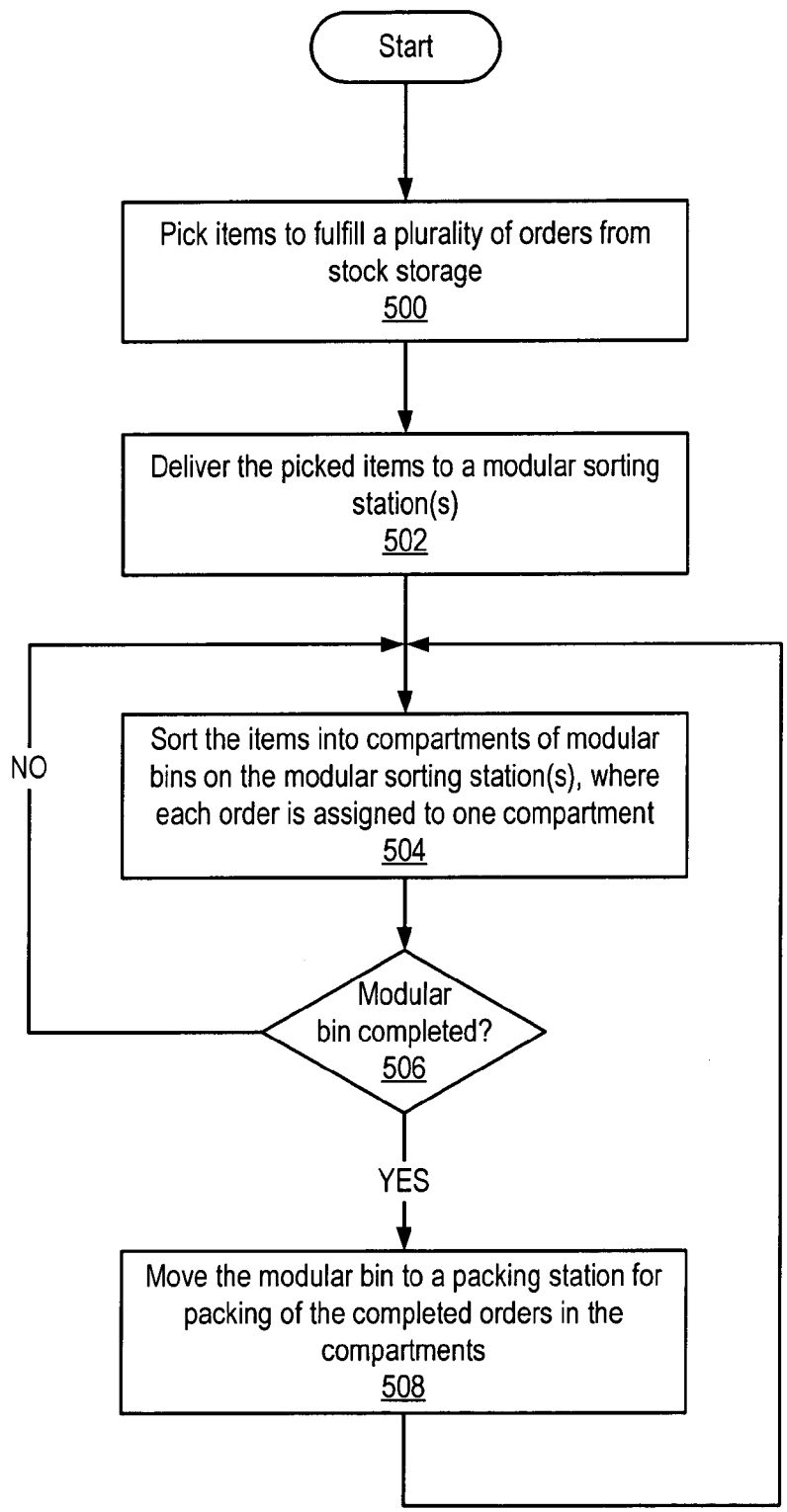
FIG. 17 is a flowchart of a method of operation of a materials handling facility utilizing a modular sorting station as described herein according to one embodiment.

FIG. 17 is a flowchart of a method of operation of a materials handling facility utilizing a modular sorting station as described herein according to one embodiment. As indicated at 500, one or more agents may pick items to fulfill a plurality of orders from stock storage in the materials handling facility. In one embodiment, the agents may use a communication device as described above to communicate with an order fulfillment control system, which may direct the agents in picking the items from stock storage. The picked items may be delivered in batches or in a stream to a modular sorting station(s), as indicated at 502. Note that the agent(s) performing the picking may continue to pick items and deliver the picked items to the modular sorting station(s) in batches or in a stream as long as there are orders to fill.

In one embodiment, one or more agents at the modular sorting station(s) may sort or rebin the incoming picked items into compartments of one or more modular bins on the one or more modular sorting stations, as indicated at 504. In one embodiment, each order is assigned to one compartment in one of the modular bins. In one embodiment, the agents may use a communication device as described above to communicate with an order fulfillment control system, which may direct the agents in sorting the picked items into the compartments of the modular bins on the modular sorting stations which are assigned to orders for which the items were picked.

A modular bin may be considered completed when all the items for all the orders assigned to compartments in the modular bin have been picked and sorted or rebinned into the compartments of the modular bin. Note that a modular bin may be considered partially completed when at least one item for at least one of the orders assigned to compartments in the modular bin have been placed in the modular bin, but one or more items for one or more of the orders assigned to compartments in the modular bin have not yet been placed in the modular bin. In one embodiment, a partially completed modular bin may be moved from one modular sorting station to another modular sorting station to continue or complete rebinning of items into the compartments of the modular bin. At 506, when a modular bin is completed, the modular bin may be moved to one of one or more packing stations for packing of the completed orders in the compartments of the modular bin, as indicated at 508. An empty (or partially completed) modular bin may be placed on the modular sorting station to replace the completed modular bin that was moved from the modular sorting station to a packing station. In one embodiment, the order fulfillment control system may detect when a modular bin is completed, and may alert an agent or agents at the modular sorting station that contains the modular bin that the modular bin is completed. Note that sorting or rebinning, as indicated at 504, may continue without interruption while completed modular bins are moved to packing stations.

Figure 18:
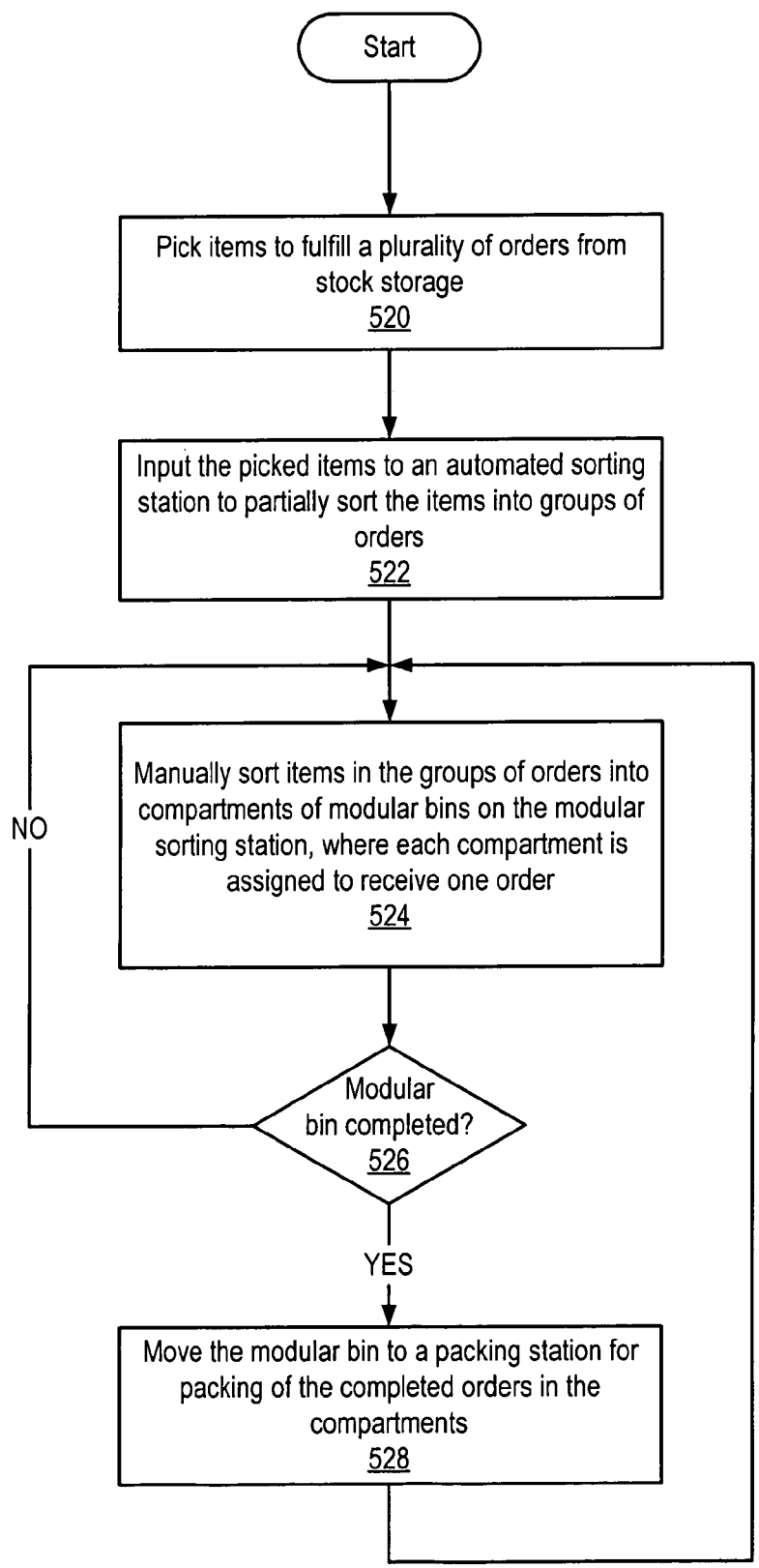
FIG. 18 is a flowchart of a method of operation of a materials handling facility utilizing a modular sorting station with an automated sorting mechanism configured to partially sort orders according to one embodiment.

FIG. 18 is a flowchart of a method of operation of a materials handling facility utilizing a modular sorting station with an automated sorting mechanism configured to partially sort orders as described herein according to one embodiment. As indicated at 520, one or more agents may pick items to fulfill a plurality of orders from stock storage in the materials handling facility. In one embodiment, the agents may use a communication device as described above to communicate with an order fulfillment control system, which may direct the agents in picking the items from stock storage. The picked items may be delivered and inducted into an automated sorting mechanism in batches or in a stream, as indicated at 522. The automated sorting mechanism may partially sort the picked items into groups of two or more orders. Note that the agent(s) performing the picking may continue to pick items and deliver the picked items to the automated sorting mechanism in batches or in a stream as long as there are orders to fill.

In one embodiment, one or more agents at the modular sorting station(s) may then manually sort the items in the groups of orders from the automated sorting mechanism into compartments of one or more modular bins on the one or more modular sorting stations, as indicated at 524. In one embodiment, each order is assigned to one compartment in one of the modular bins. In one embodiment, the agents may use a communication device as described above to communicate with an order fulfillment control system, which may direct the agents in sorting the items from the groups of orders into the compartments of the modular bins on the modular sorting stations which are assigned to the orders for which the items were picked.

A modular bin may be considered completed when all the items for all the orders assigned to compartments in the modular bin have been picked and sorted or rebinned into the compartments of the modular bin. At 526, when a modular bin is completed, the modular bin may be moved to one of one or more packing stations for packing of the completed orders in the compartments of the modular bin, as indicated at 528. An empty (or partially completed) modular bin may be placed on the modular sorting station to replace the completed modular bin that was moved from the modular sorting station to a packing station. In one embodiment, the order fulfillment control system may detect when a modular bin is completed, and may alert an agent or agents at the modular sorting station that contains the modular bin that the modular bin is completed. Note that rebinning of orders, as indicated at 524, may continue without interruption while completed modular bins are moved to packing stations.

The following applies to the methods describe in FIGS. 17 and 18. Specifically, the following refers to moving the modular bin to a packing station for packing of the completed orders in the compartments, which was described at 508 of FIG. 17 and 528 of FIG. 18.

Figure 19:
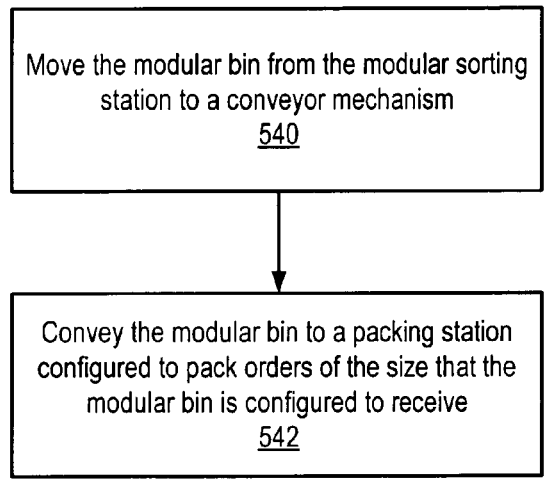
FIG. 19 is a flowchart of a method for conveying completed modular bins to packing stations.

In one embodiment, as was described in FIG. 8, the modular sorting stations may be situated away from the packing stations, and may not be associated with any one packing station. In this embodiment, completed modular bins may be placed onto a conveyance mechanism, for example a conveyor belt, rollers, or a cart, for moving to a packing station. FIG. 19 is a flowchart of a method for conveying completed modular bins to packing stations. In one embodiment, packing stations may be configured to pack orders of different sizes and/or packing types. In this embodiment, modular bins may be configured to receive orders of particular sizes or that require particular packing types. In one embodiment, completed modular bins may be placed on a conveyance mechanism to be conveyed to a packing station, as indicated at 540. The completed modular bins may be moved on the conveyance mechanism to a packing station that is configured to pack orders of the size and/or packing type of the orders in the modular bin, as indicated at 542. In one embodiment, an order fulfillment control system may control the distribution of completed modular bins to the packing stations configured to pack the orders in the modular bins.

In another embodiment, as was described in FIGS. 9A and 9B, each modular sorting station may be adjacent to and associated with a particular packing station. In this embodiment, an agent may move completed modular bins from a modular sorting station to the adjacent packing station. Note that, since each modular bin may contain two or more orders, less effort is required than in sorting station configurations where each bin contains only one order. If the packing station is configured to pack orders of a particular size and/or packing type, then the modular bins on the modular sorting station may be configured to receive orders of the size and/or packing type that the packing station is configured to pack. In one embodiment, if a modular bin is completed or partially completed on a modular sorting station adjacent to and/or associated with a packing station, and the modular bin is not configured to receive orders of the size and/or packing type that the packing station is configured to pack, the modular bin, being modular and portable, may be moved to a different packing station or modular sorting station.

Figure 20:
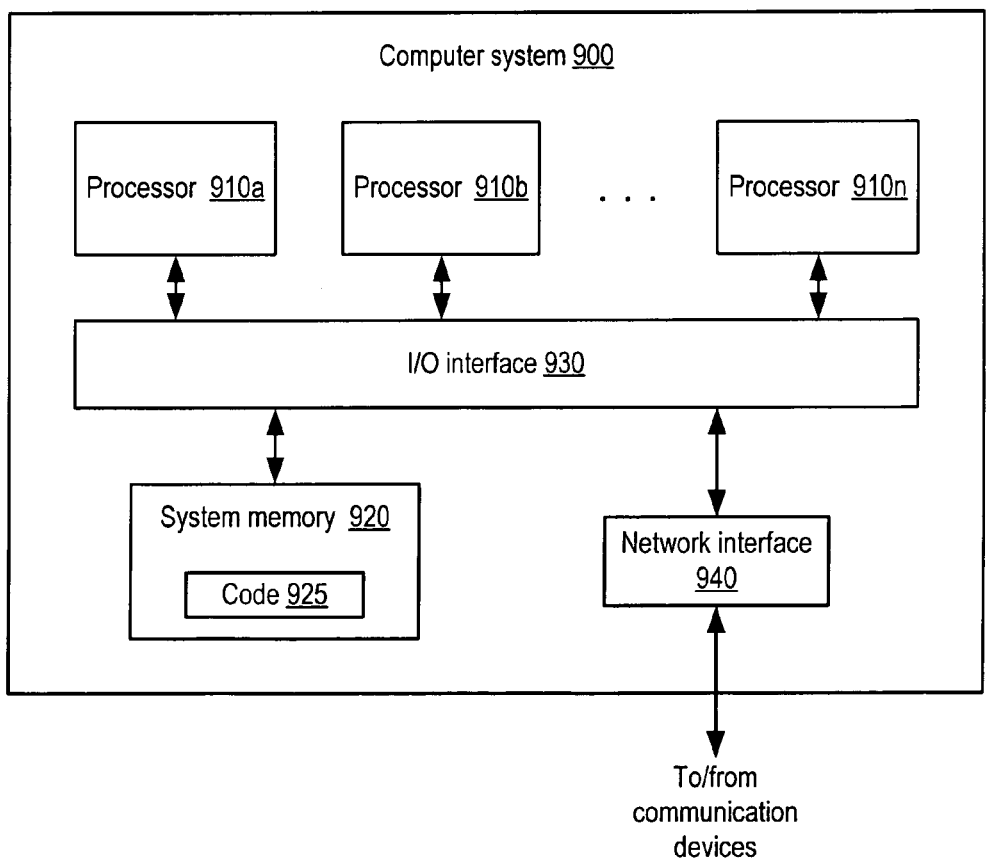
FIG. 20 is a block diagram illustrating an exemplary embodiment of a computer system.

In one embodiment, an order fulfillment control system, such as control system 260 illustrated in FIG. 14, may include a general-purpose computer system that includes or is configured to access one or more computer-accessible media, such as computer system 900 illustrated in FIG. 20. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of control system 210, while in other embodiments control system 210 may include elements in addition to computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an order fulfillment control system, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and the various communication devices 250 described above. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In one embodiment, the relationship between a control system 260 and communication devices 250 may be a server/client type of relationship. For example, control system 260 may be configured as a server computer system 900 that may convey instructions to and receive acknowledgements from communication devices 250. In such an embodiment, communication devices 250 may be relatively simple or "thin" client devices. For example, communication devices 250 may be configured as dumb terminals with display, data entry and communications capabilities, but otherwise little computational functionality. However, it is contemplated that in some embodiments, communication devices 250 may be computer systems configured similarly to computer system 900, including one or more processors 910 and various other devices (though in some embodiments, a computer system 900 implementing a communication device 250 may have somewhat different devices, or different classes of devices, compared to a computer system 900 implementing control system 260). It is further contemplated that in some embodiments, the functionality of control system 260 may be distributed across some or all of communication devices 250. That is, in some embodiments, there may be, no centralized point of control of the activity of order fulfillment center agents 240; rather, communication devices 250 may function in a cooperative, distributed fashion to coordinate the activities of the materials handling facility.

Modular Sorting Stations and Cross-Docking

Modular sorting stations may be used to support "cross-docking" for multi-item shipments. Cross-docking refers to a process of moving items from a receiving station in a materials handling facility directly to a shipping (or, alternatively, packing) station, bypassing the need to place items into static inventory locations. Conventional cross-docking processes typically may not be able to handle situations where two or more items must be sorted inside the facility and placed into a single container that is then loaded onto an outbound truck. Static storage locations are typically necessary to accumulate knowledge of the location of various items within an order prior to creating a schedule for picking, sorting, packing, and shipping those items because received items typically arrive at the receiving station in a sequence that cannot be adjusted to match the exact sequence needed to serve customers who have ordered specific combinations of items. However, embodiments of a modular sorting station as described herein may eliminate the need for a stow-to-inventory and subsequent pick-from-inventory for at least one item from a multi-item shipment in a cross-docking process. As an example, in a situation where all items but one for a multi-item order are present in a materials handling facility's inventory, the missing item may be received at a receiving station and entered into the order fulfillment control system. An agent performing receiving may be instructed by the control system to place the item into an empty compartment of a modular bin at the receiving station. Once all the slots of the modular bin are filled with items that were received and are necessary to complete one or more orders, the in-inventory items may be scheduled for picking by the control system, and the modular bin may be sent from receiving to a modular sorting station of the materials handling facility to be sorted into the appropriate orders along with the items picked from stock storage when they arrive at the modular sorting station.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:

picking a plurality of items to fulfill a plurality of orders from stock storage of a materials handling facility;

sorting the plurality of items into compartments of modular bins at one or more modular sorting stations, wherein each modular sorting station comprises two or more modular bins, wherein each modular bin is partitioned into two or more compartments, wherein each order is assigned to a particular one of the compartments in a particular one of the modular bins, wherein two or more orders are assigned to each modular bin, and wherein each item is sorted into a compartment assigned to an order for which the item was picked;

detecting when all the orders assigned to compartments in one of the modular bins at one of the modular sorting stations are completed, wherein an order is completed when all of one or more items of the order have been received in the compartment assigned to the order; and moving the modular bin from the modular sorting station to one of one or more packing stations for packaging the completed orders in the modular bin in response to said detecting.

2. The method as recited in claim 1, wherein said moving the modular bin from the modular sorting station to one of one or more packing stations comprises:

moving the modular bin from the modular sorting station to a conveyance mechanism; and the conveyance mechanism conveying the modular bin from the modular sorting station to the packing station.

3. The method as recited in claim 1, wherein said moving the modular bin from the modular sorting station to one of one or more packing stations comprises manually moving the modular bin from the modular sorting station to the packing station.

4. The method as recited in claim 1, wherein the modular bin is configured to receive orders of a particular physical dimension, wherein one of the one or more packing stations is configured to pack orders of the particular physical dimension for which the modular bin is configured to receive, and wherein said moving the modular bin from the modular sorting station to one of one or more packing stations comprises:
- determining that one of the one or more packing stations is configured to pack orders of the particular physical dimension for which the modular bin is configured to receive; and
- moving the modular bin from the modular sorting station to the packing station configured to pack orders of the particular physical dimension for which the modular bin is configured to receive.

5. The method as recited in claim 1, wherein at least two of the modular bins are partitioned into a different number of compartments, wherein the method further comprises assigning two or more of the orders to each of the modular bins according to their respective number of compartments.

6. The method as recited in claim 1, wherein each modular bin is partitioned into two or more compartments of the same or similar size, wherein the method further comprises assigning two or more of the orders to each modular bin according to the size of the two or more compartments.

7. The method as recited in claim 1, wherein each modular sorting station comprises one or more shelves each configured to hold one or more modular bins, wherein the method further comprising placing each of the modular bins onto one of the shelves of one of the modular sorting stations.

8. The method as recited in claim 7, further comprising placing one or more of the modular bins onto one or more of the shelves of the modular sorting station at an angle to improve access to the modular bins.

9. The method as recited in claim 1, wherein each item in the stock storage is marked with an item code, wherein the item code uniquely identifies the type of the item in an order fulfillment control system, and wherein the method further comprises the control system directing the placement of each picked item into a compartment of one of the modular bins assigned to an order for which the item was picked according to the item code.

10. The method as recited in claim 1, wherein each item in the stock storage is marked with an item code, wherein the item code uniquely identifies the item in an order fulfillment control system, and wherein the method further comprises the control system directing the placement of each picked item into a compartment of one of the modular bins assigned to an order for which the item was picked according to the item code.

11. The method as recited in claim 1, wherein each modular sorting station is marked with a modular sorting station code, wherein the modular sorting station code uniquely identifies the modular sorting station in an order fulfillment control system, and wherein the method further comprises the control system directing the movement of each picked item to one of the modular sorting stations according to the modular sorting station code.

12. The method as recited in claim 1, wherein each modular bin is marked with a modular bin code, wherein the modular bin code uniquely identifies the modular bin in an order fulfillment control system, and wherein the method further comprises the control system directing the placement of each picked item into one of the modular bins assigned to an order for which the item was picked according to the modular bin code.

13. The method as recited in claim 1, wherein each compartment in each modular bin is assigned a compartment identifier, wherein the compartment identifier uniquely identifies the compartment in an order fulfillment control system, and wherein the method further comprises the control system directing the placement of each picked item into a compartment of one of the modular bins assigned to an order for which the item was picked according to the compartment identifier.

14. The method as recited in claim 13, wherein each modular bin is marked with a modular bin code, wherein the modular bin code uniquely identifies the modular bin in the order fulfillment control system, wherein the compartment identifier is a combination of a modular bin code of the modular bin that comprises the compartment and a compartment number in the modular bin, and wherein the method further comprises the control system directing the placement of each picked item into a compartment of one of the modular bins assigned to an order for which the item was picked according to the compartment identifier.

15. The method as recited in claim 1,
- wherein said picking a plurality of items to fulfill a plurality of orders from stock storage of a materials handling facility comprises one or more picking agents accessing mobile devices configured to communicate with an order fulfillment control system to direct the picking agents in picking the items from the stock storage to fill the orders;
- wherein said sorting the plurality of items into compartments of modular bins at one or more modular sorting stations comprises one or more sorting agents accessing mobile devices configured to communicate with the order fulfillment control system to direct the sorting agents in sorting the plurality of items into the compartments of the modular bins at the one or more modular sorting stations; and
- wherein said moving the modular bin from the modular sorting station to one of one or more packing stations for packaging the completed orders in the modular bin comprises an agent accessing a mobile device configured to communicate with the order fulfillment control system to direct the agent in moving the modular bin from the modular sorting station to the one of the one or more packing stations.

16. The method as recited in claim 1, wherein said sorting the plurality of items into compartments of modular bins at one or more modular sorting stations comprises an order fulfillment control system directing one or more agents in sorting the plurality of items into the compartments of the modular bins at the one or more modular sorting stations.

17. The method as recited in claim 16, further comprising the control system assigning orders to particular compartments in particular modular bins in the modular sorting stations.

18. The method as recited in claim 1,
- wherein said detecting when all the orders assigned to compartments in one of the modular bins at one of the modular sorting stations are completed comprises an order fulfillment control system detecting when all the orders assigned to the compartments in the one of the modular bins at the one of the modular sorting stations are completed; and
- wherein the method further comprises the control system notifying an agent of the materials handling facility that the modular bin is ready to be moved from the modular sorting station to one of the one or more packing stations for packaging the completed orders in the modular bin.

19. The method as recited in claim 1, wherein said sorting the plurality of items into compartments of modular bins at one or more modular sorting stations comprises:

inducting the picked items into an automated sorting mechanism;

the automated sorting mechanism sorting the picked items into groups of two or more orders; and manually sorting the items in the groups of orders into particular compartments of the modular bins of the modular sorting stations assigned to the orders.

20. The method as recited in claim 1, further comprising moving a modular bin from one modular sorting station to another modular sorting station.

21. A method, comprising:

picking a plurality of items to fulfill a plurality of orders from stock storage of a materials handling facility;

sorting the plurality of items into compartments of modular bins at one or more modular sorting stations, wherein each modular sorting station comprises two or more modular bins, wherein each modular bin is partitioned into two or more compartments, wherein each order is assigned to a particular one of the compartments in a particular one of the modular bins, and wherein each item is sorted into a compartment assigned to an order for which the item was picked;

detecting when all the orders assigned to compartments in one of the modular bins at one of the modular sorting stations are completed, wherein an order is completed when all of one or more items of the order have been received in the compartment assigned to the order;

moving the modular bin from the modular sorting station to one of one or more packing stations for packaging the completed orders in the modular bin in response to said detecting; and moving a modular bin in which one or more orders assigned to compartments of the modular bin are incomplete from one modular sorting station to another modular sorting station for completion of the one or more incomplete orders in the modular bin.

22. A computer-accessible storage medium, comprising program instructions, wherein the program instructions are configured to implement:

instructing one or more agents in picking a plurality of items to fulfill a plurality of orders from stock storage of a materials handling facility;

controlling sorting of the plurality of items into compartments of modular bins at one or more modular sorting stations, wherein each modular sorting station comprises two or more modular bins, wherein each modular bin is partitioned into two or more compartments, wherein each order is assigned to a particular one of the compartments in a particular one of the modular bins, wherein two or more orders are assigned to each modular bin, and wherein each item is sorted into a compartment assigned to an order for which the item was picked;

detecting when all the orders assigned to compartments in one of the modular bins at one of the modular sorting stations are completed, wherein an order is completed when all of one or more items of the order have been received in the compartment assigned to the order; and directing movement of the modular bin from the modular sorting station to one of one or more packing stations for packaging the completed orders in the modular bin in response to said detecting.

23. The computer-accessible medium as recited in claim 22, wherein, in said movement of the modular bin from the modular sorting station to one of one or more packing stations, the program instructions are further configured to implement:

directing movement of the modular bin from the modular sorting station to a conveyance mechanism; and controlling the conveyance mechanism to convey the modular bin from the modular sorting station to the packing station.

24. The computer-accessible medium as recited in claim 22, wherein, in said movement of the modular bin from the modular sorting station to one of one or more packing stations, the program instructions are further configured to implement directing movement of the modular bin from the modular sorting station to the packing station.

25. The computer-accessible medium as recited in claim 22, wherein the modular bin is configured to receive orders of a particular physical dimension, wherein one of the one or more packing stations is configured to pack orders of the physical dimension for which the modular bin is configured to receive, and wherein, in said directing movement of the modular bin from the modular sorting station to one of one or more packing stations, the program instructions are further configured to implement:

determining that one of the one or more packing stations is configured to pack orders of the particular physical dimension for which the modular bin is configured to receive; and directing movement of the modular bin from the modular sorting station to the packing station configured to pack orders of the physical dimension for which the modular bin is configured to receive.

26. The computer-accessible medium as recited in claim 22, wherein at least two of the modular bins are partitioned into a different number of compartments, wherein the program instructions are further configured to implement assigning two or more of the orders to each of the modular bins according to their respective number of compartments.

27. The computer-accessible medium as recited in claim 22, wherein each modular bin is partitioned into two or more compartments of the same or similar size, and wherein the program instructions are further configured to implement assigning two or more of the orders to each modular bin according to the size of the two or more compartments.

28. The computer-accessible medium as recited in claim 22, wherein each modular sorting station comprises one or more shelves each configured to hold one or more modular bins, and wherein the program instructions are further configured to directing the placing each of the modular bins onto one of the shelves of one of the modular sorting stations.

29. The computer-accessible medium as recited in claim 28, wherein the program instructions are further configured to implement directing the placing of one or more of the modular bins onto one or more of the shelves of the modular sorting station at an angle to improve access to the modular bins.

30. The computer-accessible medium as recited in claim 22, wherein each item in the stock storage is marked with an item code, wherein the item code uniquely identifies the type of the item, and wherein, in said controlling sorting of the plurality of items into compartments of modular bins at one or more modular sorting stations, the program instructions are further configured to implement controlling sorting of the plurality of items into compartments of modular bins at one or more modular sorting stations according to the item codes of the items.

31. The computer-accessible medium as recited in claim 22, wherein each item in the stock storage is marked with an item code, wherein the item code uniquely identifies the item, and wherein, in said controlling sorting of the plurality of items into compartments of modular bins at one or more modular sorting stations, the program instructions are further configured to implement controlling sorting of the plurality of items into compartments of modular bins at one or more modular sorting stations according to the item codes of the items.

32. The computer-accessible medium as recited in claim 22, wherein each compartment in each modular bin is assigned a compartment identifier, wherein the compartment identifier uniquely identifies the compartment in an order fulfillment control system, and wherein, in said controlling sorting of the plurality of items into compartments of modular bins at one or more modular sorting stations, the program instructions are further configured to implement controlling sorting of the plurality of items into compartments of modular bins at one or more modular sorting stations according to the compartment identifiers.

33. The computer-accessible medium as recited in claim 32, wherein each modular bin is marked with a modular bin code, wherein the modular bin code uniquely identifies the modular bin in the order fulfillment control system, wherein the compartment identifier is a combination of a modular bin code of the modular bin that comprises the compartment and a compartment number in the modular bin, and wherein the program instructions are further configured to implement directing the placing of each picked item into a compartment of one of the modular bins assigned to an order for which the item was picked according to the compartment identifier.

34. The computer-accessible medium as recited in claim 22, wherein, in said controlling sorting of the plurality of items into compartments of modular bins at one or more modular sorting stations, the program instructions are further configured to implement directing one or more agents in sorting the plurality of items into the compartments of the modular bins at the one or more modular sorting stations.

35. The computer-accessible medium as recited in claim 34, wherein the program instructions are further configured to implement assigning orders to particular compartments in particular modular bins in the modular sorting stations.

36. The computer-accessible medium as recited in claim 22, wherein, in said directing movement of the modular bin from the modular sorting station to one of one or more packing stations for packaging the completed orders in the modular bin in response to said detecting, the program instructions are further configured to implement notifying an agent of the materials handling facility that the modular bin is ready to be moved from the modular sorting station to one of the one or more packing stations for packaging the completed orders in the modular bin.

37. The computer-accessible medium as recited in claim 22, wherein, in said controlling sorting of the plurality of items into compartments of modular bins at one or more modular sorting stations, the program instructions are further configured to implement:
controlling an automated sorting mechanism in sorting the picked items into groups of two or more orders; and
directing manual sorting of the items in the groups of orders into particular compartments of the modular bins of the modular sorting stations assigned to the orders.

38. The computer-accessible medium as recited in claim 22, wherein the program instructions are further configured to implement directing the movement of a modular bin from one modular sorting station to another modular sorting station.

39. A computer-accessible storage medium comprising program instructions, wherein the program instructions are configured to implement:
instructing one or more agents in picking a plurality of items to fulfill a plurality of orders from stock storage of a materials handling facility;
controlling sorting of the plurality of items into compartments of modular bins at one or more modular sorting stations, wherein each modular sorting station comprises two or more modular bins, wherein each modular bin is partitioned into two or more compartments, wherein each order is assigned to a particular one of the compartments in a particular one of the modular bins, and wherein each item is sorted into a compartment assigned to an order for which the item was picked;
detecting when all the orders assigned to compartments in one of the modular bins at one of the modular sorting stations are completed, wherein an order is completed when all of one or more items of the order have been received in the compartment assigned to the order;
directing movement of the modular bin from the modular sorting station to one of one or more packing stations for packaging the completed orders in the modular bin in response to said detecting; and
directing the movement of a modular bin in which one or more orders assigned to compartments of the modular bin are incomplete from one modular sorting station to another modular sorting station for completion of the one or more incomplete orders in the modular bin.

* * * * *